US011468619B2

(12) United States Patent
Stukalov

(10) Patent No.: US 11,468,619 B2
(45) Date of Patent: *Oct. 11, 2022

(54) ANIMATING DIGITAL GRAPHICS OVERLAID ON VISUAL MEDIA ITEMS BASED ON DYNAMIC ATTRIBUTES

(71) Applicant: WhatsApp LLC, Menlo Park, CA (US)

(72) Inventor: Dmitri Stukalov, Palo Alto, CA (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,129

(22) Filed: May 25, 2021

(65) Prior Publication Data

US 2022/0044465 A1 Feb. 10, 2022

Related U.S. Application Data

(63) Continuation of application No. 16/943,936, filed on Jul. 30, 2020, now Pat. No. 11,017,579, which is a
(Continued)

(51) Int. Cl.
*G06T 13/80* (2011.01)
*G06T 11/60* (2006.01)
*G06T 11/00* (2006.01)
*G06T 13/00* (2011.01)
*G06T 3/40* (2006.01)
*G06F 3/04842* (2022.01)
*G06F 3/0346* (2013.01)

(52) U.S. Cl.
CPC ............ *G06T 13/80* (2013.01); *G06T 11/001* (2013.01); *G06T 11/60* (2013.01); *G06T 13/00* (2013.01); *G06F 3/0346* (2013.01); *G06F 3/04842* (2013.01); *G06F 2200/1637* (2013.01); *G06T 3/40* (2013.01); *G06T 2200/24* (2013.01)

(58) Field of Classification Search
CPC ....... G06T 13/80; G06T 11/001; G06T 11/60; G06T 13/00; G06T 3/40; G06T 2200/24; G06F 3/0346; G06F 3/04842; G06F 2200/1637
See application file for complete search history.

(56) References Cited

U.S. PATENT DOCUMENTS 10,460,499 B2 * 10/2019 Stukalov ............... G06F 1/1694
10,740,947 B2 * 8/2020 Stukalov ............... G06T 13/80
(Continued)

OTHER PUBLICATIONS

U.S. Appl. No. 15/717,795, filed Feb. 25, 2019, Office Action.
(Continued)

*Primary Examiner* — Chong Wu
(74) *Attorney, Agent, or Firm* — Keller Preece PLLC

(57) ABSTRACT

This disclosure covers methods, computer-readable media, and systems that animate a digital graphic associated with a video or other visual media item based on a detected dynamic attribute. In particular, the disclosed methods, computer-readable media, and systems detect sensor data from a client device or a motion of an object within a video or other visual media item. Based on the detected sensor data or motion of an object within a visual media item, the methods, computer-readable media, and systems overlay and animate an emoji or other digital graphic selected by a user on a video or other visual media item.

20 Claims, 13 Drawing Sheets

Related U.S. Application Data continuation of application No. 16/664,479, filed on Oct. 25, 2019, now Pat. No. 10,740,947, which is a continuation of application No. 15/717,795, filed on Sep. 27, 2017, now Pat. No. 10,460,499.

(56) References Cited

U.S. PATENT DOCUMENTS

| | | |
|---|---|---|
| 11,017,579 B2 * | 5/2021 | Stukalov .................. G06T 11/60 |
| 2013/0162632 A1 | 6/2013 | Varga et al. |
| 2016/0349936 A1 | 12/2016 | Cho et al. |
| 2016/0353252 A1 | 12/2016 | Krasadakis |
| 2017/0123636 A1 | 5/2017 | Lim et al. |
| 2018/0350127 A1 * | 12/2018 | Davidson ................ H04L 51/04 |
| 2019/0096113 A1 | 3/2019 | Stukalov |

OTHER PUBLICATIONS

U.S. Appl. No. 15/717,795, filed Jun. 17, 2019, Notice of Allowance.
U.S. Appl. No. 16/664,479, filed Apr. 6, 2020, Notice of Allowance.
U.S. Appl. No. 16/664,479, filed Jan. 8, 2020, Office Action.
U.S. Appl. No. 62/544,785, filed Aug. 12, 2017, titled: "Methods and Apparatus for Dynamic, Expressive Animation Based Upon Specific Environments".

* cited by examiner

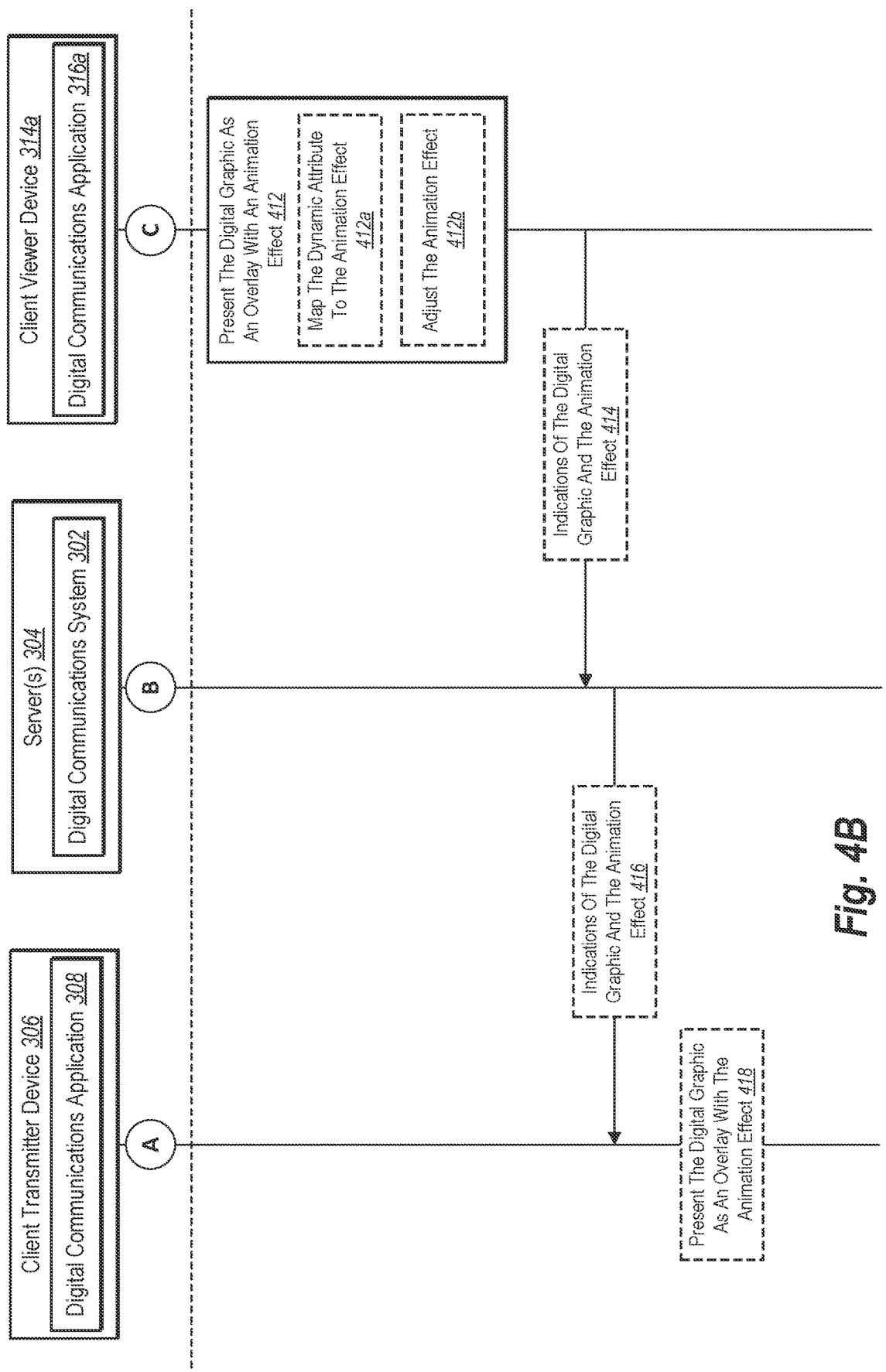

ANIMATING DIGITAL GRAPHICS OVERLAID ON VISUAL MEDIA ITEMS BASED ON DYNAMIC ATTRIBUTES

CROSS-REFERENCE TO RELATED APPLICATIONS

The present application is a continuation of U.S. application Ser. No. 16/943,936, filed on Jul. 30, 2020, which is a continuation of U.S. application Ser. No. 16/664,479, filed on Oct. 25, 2019 which issued as U.S. Pat. No. 10,740,947, which is a continuation of U.S. application Ser. No. 15/717, 795, filed on Sep. 27, 2017 which issued as U.S. Pat. No. 10,460,499. Each of the aforementioned applications is hereby incorporated by reference in its entirety.

BACKGROUND

Recent years have seen rapid development in systems that enable individuals to digitally communicate with others. Indeed, as a result of proliferation in smartphones, tablets, laptops, computers, smart watches, smart televisions, and other computing devices, individuals have increased access to devices capable of sending and receiving information in relation to other individual users. Accordingly, developers have generated a variety of digital applications that allow clients to utilize computing devices to participate in various forms of digital communication.

For example, some conventional digital communications systems enable users to send videos, images, emoji, stickers, and other types of communications. Furthermore, some conventional digital communications systems further enable users to add comments to visual media items exchanged through the digital communications systems. For example, some digital communications systems enable a user to add a written comment below or overlaid on a video sent in a communication thread. Although such conventional systems allow users to communicate with multiple types of content and comment or react to such communications, these systems have a number of shortcomings. For instance, although conventional digital communications systems provide for commenting, conventional commenting is standardized and rigid and provides little to no flexibility. Indeed, many conventional digital communications systems limit comments to written text and reactions to standardized emoji and stickers. As written text or standardized emoji and stickers, conventional comments and reactions for a digital image, video, or live-stream video often lack expressive nature and individuality.

Under some circumstances, users in a messaging thread may add longer comments to communicate a more expressive response. Particularly in mobile devices, long or multiple comments elongate a messaging thread such that a mobile device's screen no longer shows the visual media item to which the comments pertain. Additionally, long or multiple comments that provide for expressive responses often clutter the user interface of mobile devices.

These and other problems exist with regard to conventional digital communications systems for communicating and sharing digital messages with other users.

SUMMARY

This disclosure describes one or more embodiments of methods, computer-readable media, and systems that solve some or all the foregoing problems and provide other benefits. To solve these and other problems, the disclosed methods, computer-readable media, and systems animate a digital graphic associated with a video or other visual media item based on a detected dynamic attribute. The disclosed methods, computer-readable media, and systems may, for example, detect sensor data from a client device as a dynamic attribute or a motion of an object within a video or other visual media item as a dynamic attribute. Based on the detected dynamic attribute, the methods, computer-readable media, and systems overlay and animate an emoji or other digital graphic selected by a user on a video or other visual media item.

For instance, in some embodiments, the methods, computer-readable media, and systems receive a selection from a user to overlay a digital graphic on a visual media item. The methods, computer-readable media, and systems then detect or receive a dynamic attribute from a client device, such as by detecting sensor data from the client device or detecting a motion of an object within the visual media item. Using this dynamic attribute as a trigger, the disclosed methods, computer-readable media, and systems then provide the digital graphic as an overlay on the visual media item with an animation effect.

By animating the digital graphic to reflect the detected dynamic attribute, the disclosed methods, computer-readable media, and systems provide a digital graphic that reflects a motion or change associated with a client device that presents a visual media item. Accordingly, the disclosed methods, computer-readable media, and systems represent a motion of an object within the visual media item or a motion or other change to a client device by animating a selected digital graphic associated with the visual media item. That animation is thus individualized and communicates a user's interaction with (or reaction to) a visual media item without requiring verbose comments.

BRIEF DESCRIPTION OF THE DRAWINGS

The detailed description refers to the drawings briefly described below.

FIGS. 4A-4B illustrate a sequence-flow diagram of animating a digital graphic associated with a visual media item based on a detected dynamic attribute in accordance with one or more embodiments.

DETAILED DESCRIPTION

Figure 1B:
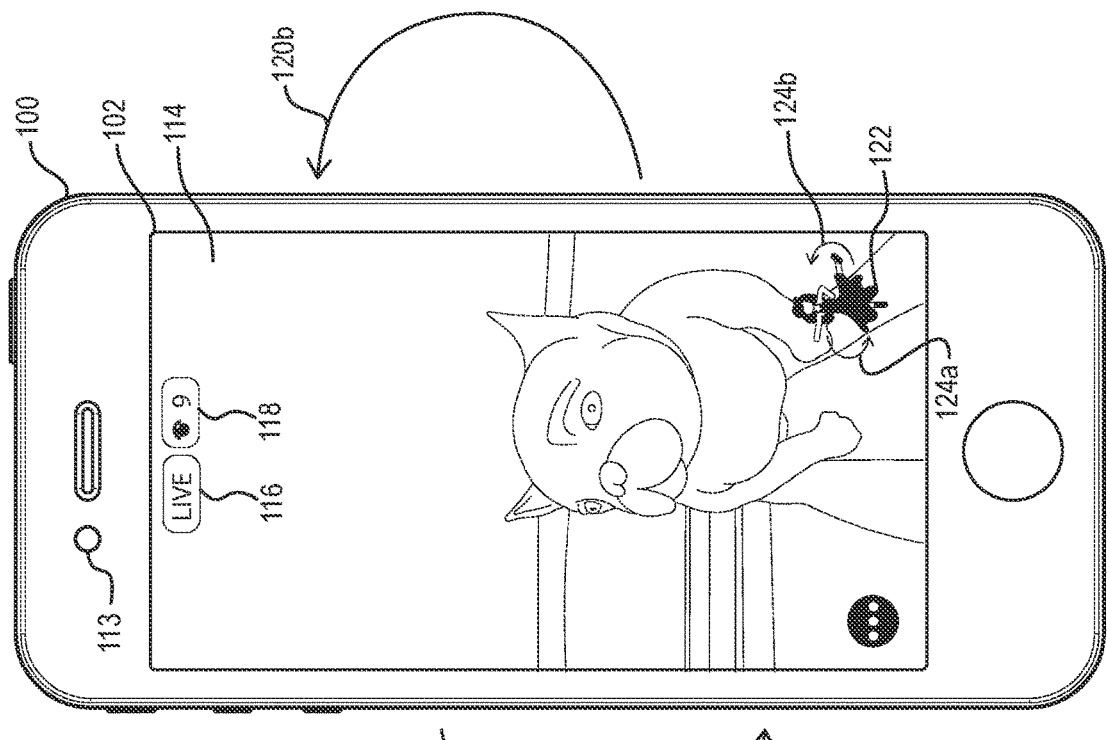
FIGS. 1A-1B illustrate user interfaces of a client device that comprise a digital graphic overlaid on a video with an animation effect based on sensor data from the client device in accordance with one or more embodiments.

This disclosure describes one or more embodiments of a digital communications system that animates a digital graphic associated with a video or other visual media item based on a detected dynamic attribute. In some embodiments, for example, the disclosed digital communications system detects sensor data from a client device as a dynamic attribute or a motion within a video of the client device as a dynamic attribute. The digital communications system then overlays and animates a digital graphic selected by a user on a video or other visual media item based on the detected dynamic attribute.

For instance, in some embodiments, the digital communications system receives a selection from a user to overlay a digital graphic on a visual media item. The digital communications system then detects a dynamic attribute or receives an indication of a dynamic attribute from a client device. The digital communications system may, for example, detect sensor data from the client device or a motion of an object within the visual media item as a dynamic attribute. Using the dynamic attribute as a trigger, the digital communications system provides the digital graphic as an overlay on the visual media item with an animation effect based on the dynamic attribute.

When detecting a dynamic attribute, the digital communications system may detect a dynamic attribute from the client device's sensor. This dynamic attribute may represent a direction, motion, orientation, or other spatial reference of a client device. In some embodiments, the digital communications system then determines an animation effect for a selected digital graphic based on the dynamic attribute. For example, the digital communications system may determine that a jumping animation or spinning animation corresponds to a detected motion or orientation from a client device's sensor. In some cases, the digital communications system maps the dynamic attribute to an animation effect. This animation effect may be the only animation effect corresponding to a selected digital graphic or one of many animation effects to which the digital communications system may map the dynamic attribute.

By contrast, in some embodiments, the digital communications system detects (as a dynamic attribute) a motion of an object within a visual media item. The digital communications system may detect, for example, a pattern or a speed of an object's motion within a video. The digital communications system then optionally determines an animation effect for a selected digital graphic based on the detected motion of the object within the visual media item. For example, the digital communications system may determine that a beating-heart animation or flashing animation corresponds to a detected pattern or speed of the object's motion. Similar to some embodiments noted above, in some cases, the digital communications system maps the motion of an object within a visual media item to an animation effect.

The digital communications system can use the dynamic attribute to identify an animation to apply, determine a characteristic to apply to an animation effect, or a combination of the foregoing. For example, a given selected digital graphic may be associated with a plurality of animation effects each mapped to a different type of dynamic attribute or a different magnitude of a dynamic attribute. Based on the detected dynamic attribute, the digital communications system can identify an animation effect of the plurality of animation effects to apply to the selected digital graphic.

On the other hand, in one or more embodiments, a given digital graphic may be associated with a single animation effect. In such, instances of the digital communications system use the dynamic attribute to select or modify a characteristic of the animation effect. For instance, based on the detected dynamic attribute, or a magnitude of the detected dynamic attribute, the digital communications system can modify the frequency, size, duration, opacity, or other characteristic of the animation effect. For example, the digital communications system may increase the frequency of an animation effect based on detecting an accelerating motion of a client device. Alternatively, the digital communications system may decrease the frequency of an animation effect based on detecting that a decelerating motion of an object within a visual media item.

As noted above, some conventional digital communications systems lack suitable response mechanisms for users to interact with visual media items or to receive indications of other users' feedback. Indeed, some such conventional digital communications systems provide options for a user to add an emoji or a digital sticker to a digital image or a video. But such emojis and digital stickers are often static or otherwise do not reflect a user's interaction or response to a visual media item. Such emojis and digital stickers also often fail to account for any movement from within the visual media item or from the client device. The disclosed digital communications system, however, provides emojis, digital stickers, and other digital graphics that represent user interactions and movement through animation.

The disclosed digital communications system thus delivers a more dynamic digital graphic that use animation to represent dynamic attributes from the client device. The animation may reflect motion or change within (or without) a client device. As noted above, the disclosed digital communications system may represent a motion of an object within the visual media item or a motion or other change to a client device by animating a selected digital graphic associated with the visual media item. That animation communicates a user's interaction with (or reaction to) a visual media item and thus creates a more interactive experience.

In addition to creating a more interactive and dynamic experience with animated digital graphics, the disclosed digital communications system may also reduce the amount of data shown within a graphical user interface of a computing device, such as a mobile device. As noted above, some digital communications systems enable users to add comments below or overlaid on digital images and video. But written comments can obfuscate a digital image or video when, for example, a messaging thread associated with or overlaid on a digital image or video becomes lengthy. The disclosed digital communications system, however, reduces the clutter of written comments by providing animated digital graphics as another option for users to communicate or interact with a visual media item. Users may frequently choose the ease and expressiveness of an animated digital graphic rather than written comments and thus free up space on a graphical user interface for the underlying visual media item.

Figure 1A:
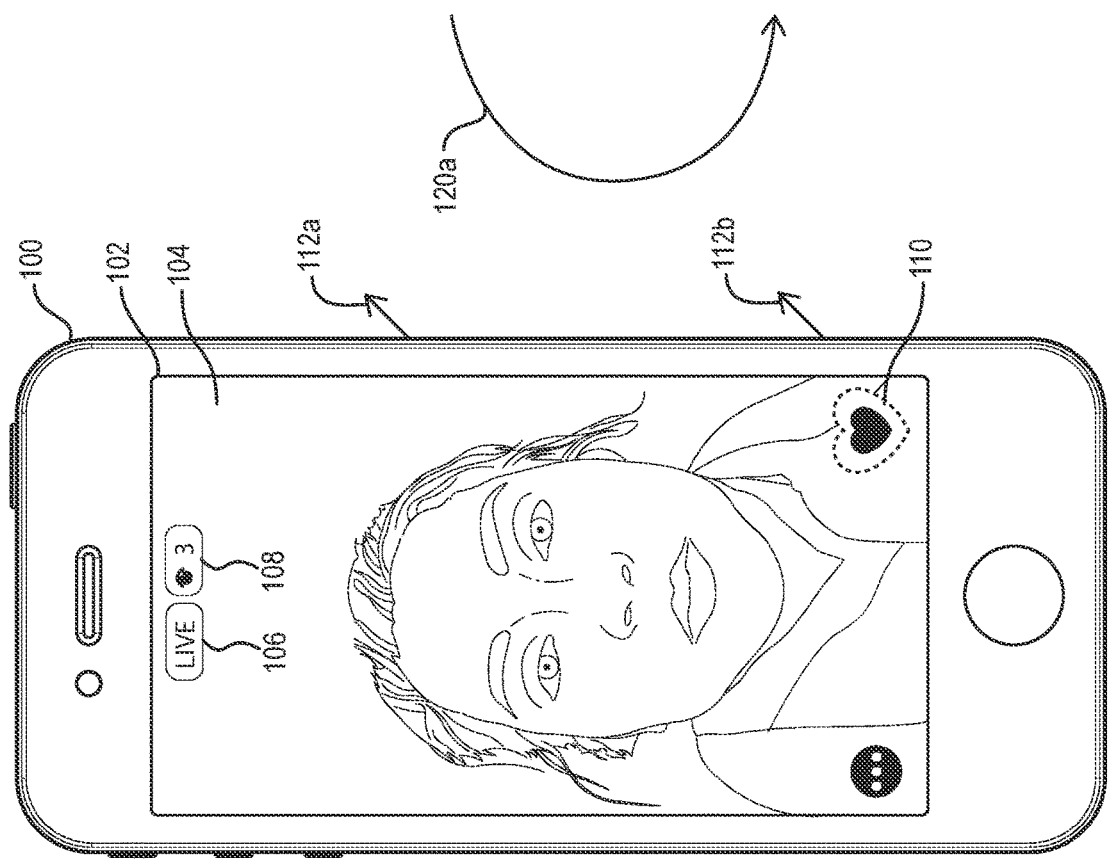

Turning now to the figures, FIGS. 1A and 1B illustrate graphical user interfaces of a client device that include digital graphics as overlays on visual media items. As indicated by FIGS. 1A and 1B, the digital communications system provides these digital graphics with animation effects. To trigger the depicted animation effects, the digital communications system detects sensor data from a sensor of the client device and then presents digital graphics with animation effects based on the detected sensor data. In other words, FIGS. 1A and 1B illustrate an embodiment of the digital communications system that detects sensor data as a dynamic attribute that triggers the client device to present digital graphics with animation effects. In some embodiments, the digital communications system causes a client device to present a digital graphic as an overlay initially without an animation effect and then—upon detecting a dynamic attribute—causes the client device to present the digital graphic with the animation effect.

As used in this disclosure, the term "digital graphic" refers to a digital drawing, emoji, icon, illustration, sticker, or combination thereof. For example, the digital communications system may create or present a vector graphic, vector artwork, rasterized graphic, or rasterized artwork as a digital graphic. In some embodiments, for instance, the digital communications system uses emojis or other digital graphics as overlays on a digital image, video, or other visual media item. The term "visual media item" refers to a digital image, video, or live-video stream. Accordingly, a visual media item may include both static digital images and dynamic digital images. For instance, a visual media item may include a static digital image, a bitmap image in Graphics Interchange Format ("GIF"), or a digital video.

Relatedly, the term "animation effect" refers to computer animation of a digital graphic that creates an illusion of movement or other change to the digital graphic. In some embodiments, an animation effect comprises successive presentation of two-dimensional or three-dimensional digital images to create an illusion that a digital graphic is moving. For example, an animation effect may include rapidly presenting a series of two-dimensional digital images to mimic a beating heart using digital images of a heart repeatedly expanding and contracting in size. In some embodiments, the animation effect runs in a loop by repeatedly presenting digital images in a particular order. Alternatively or additionally, in some embodiments, the animation effect successively presents digital images in a particular order—and then presents the digital images in a reverse order—to create an animation effect of a forwards-and-backwards movement.

The term "dynamic attribute" refers to sensor data from a client device or a motion of an object within a visual media item. For example, a dynamic attribute may include sensor data from an accelerometer, gyroscope, light sensor, or Global Position System ("GPS") of a client device. As another example, a dynamic attribute may include a motion of a person, pixel, or any other object within a live-video stream, video, GIF, or other visual media item.

In the embodiments shown in FIGS. 1A-2B, the digital communications system includes instructions that, when executed by a processor of a client device, cause the client device to perform certain actions, such as present a visual media item within a graphical user interface, detect dynamic attributes, and present digital graphics as overlays on visual media items with animation effects. In some embodiments, the digital communications system takes the form of a digital communications application running on the client device. In other embodiments, the digital communications system takes the form of software running on a server that communicates with the client device. Rather than repeatedly describe the relationship between the instructions within the digital communications system and the client device, this disclosure primarily describes the digital communications system as performing certain acts as a shorthand for that relationship.

Turning back now to FIG. 1A, this figure illustrates the digital communications system providing a digital graphic 110 as an overlay on a video within a graphical user interface 104 ("GUI 104"). As shown, a client device 100 includes a touch screen 102 that facilitates presentation of the video within the GUI 104. Although not shown, an additional client device transmits the video depicted within the GUI 104 to the client device 100. The digital communications system (e.g., a digital communications application running on the client device 100) includes instructions that, when executed by a processor of the client device 100, cause the client device 100 to present the video to the viewer. Accordingly, FIG. 1A depicts the video from a viewer's perspective, where the viewer operates the client device 100.

As depicted by FIG. 1A, the client device 100 receives user input from the viewer to overlay the digital graphic 110 on the video within the GUI 104. For example, the digital communications system may present a menu of digital graphics on the GUI 104 from which the viewer may select for overlay on the video. The digital communications system then receives an indication of a user selection of the digital graphic 110 on the touch screen 102 and identifies metadata associated with the digital graphic 110. The identified metadata indicates an animation effect for the digital graphic 110 and a dynamic attribute that triggers the animation effect.

Consistent with the metadata associated with the digital graphic 110, the digital communications system detects the dynamic attribute specified by the metadata. As shown in FIG. 1A, arrows 112a and 112b represent a speed detected by an accelerometer as the dynamic attribute specified by the metadata. Per the digital communications system's instructions, the accelerometer of the client device 100 detects a speed of the client device 100 in the direction indicated by the arrows 112a and 112b. The client device 100 in turn communicates the accelerometer data to the digital communications system as a particular speed (e.g., 10 miles per hour as the viewer runs, 30 miles per hour as the viewer travels in a car).

Upon receiving the accelerometer data—and per the digital communications system's instructions—the client device 100 presents the digital graphic 110 as an overlay within the GUI 104 with the animation effect. As specified by the metadata, the animation effect in this particular embodiment represents a beating heart. Per the digital communications system's instructions, the client device 100 interchangeably presents larger and smaller images of the digital graphic 110 to create the illusion of a beating heart as the animation effect. The dotted outline of the digital graphic 110 represents a larger image, and the solid-colored shape within the dotted outline of the digital graphic 110 represents a smaller image.

As noted above, in some embodiments, the digital communications system also determines a magnitude of a dynamic attribute and presents a digital graphic with an animation effect having a frequency based on the magnitude of the dynamic attribute. FIG. 1A depicts one embodiment of this correlation between a dynamic attribute's magnitude and an animation effect's frequency. Specifically, as the client device 100 detects a faster speed from the accelerometer, the digital communications system increases the frequency of the beating animation—with the client device 100 more rapidly presenting large and small images of the digital graphic 110 in proportion to the faster speed. By contrast, as the client device 100 detects a slower speed from the accelerometer, the digital communications system decreases the frequency of the beating animation—with the client device 100 more slowly presenting the large and small images of the digital graphic 110 in proportion to the slower speed.

In addition to the digital graphic 110, in one or more embodiments, the GUI 104 includes a live indicator 106 and a viewer indicator 108. The live indicator 106 indicates to the viewer that the digital communications system is currently broadcasting the video. As noted above and as shown in FIG. 1A, the video within the GUI 104 is a live-video stream transmitted by another client device. Relatedly, the viewer indicator 108 indicates a number of viewers who are currently viewing the live-video stream. As noted above, however, in some embodiments, the visual media item may include a live video or previously recorded video and may be transmitted from one client device to a single client device, rather than as a broadcast to multiple client devices.

In addition to broadcast and one-to-one-client-device transmission of video, in some embodiments, the digital communications system also transmits an indication of a digital graphic selected by a user (and a corresponding animation effect) for presentation to other client devices. In the embodiment shown in FIG. 1A, for example, the digital communications system transmits an indication of the digital graphic 110 and an indication of its corresponding animation effect to other client devices presenting the live-video stream, including the client device from which the live-video stream originates. Upon receipt, the indication of the digital graphic 110 and the indication of the animation effect trigger the digital communications system to present the digital graphic 110 as an overlay on the live-stream video within graphical user interfaces of the other client devices. In some such embodiments, the digital communications system presents the digital graphic 110 as an overlay with the animation effect based on the detected speed, as described above.

Turning now to FIG. 1B, this figure illustrates the digital communications system providing a digital graphic 122 as an overlay on a live-stream video within a graphical user interface 114 ("GUI 114"). As shown, the client device 100 presents the live-video stream within the GUI 104. By contrast to FIG. 1A, the client device 100 in FIG. 1B both records and transmits the live-video stream. Specifically, in response to a user selecting a live-transmission option (not shown) or another option associated with a live-video stream, the client device 100 initiates a live-video stream as follows: a camera 113 of the client device 100 captures a video from the user's perspective, the client device 100 transmits a live-video stream to the digital communications system, and the client device 100 presents the live-video stream within the GUI 114 through the touch screen 102. The GUI 114 thus presents a display of the live-video stream for the user during a live-video-stream broadcast.

As depicted by FIG. 1B, the client device 100 receives user input from the user to overlay the digital graphic 122 on the video within the GUI 114. Upon receiving an indication of a user selection of the digital graphic 122 on the touch screen 102, the digital communications system identifies metadata associated with the digital graphic 110. In the embodiment of FIG. 1B, the metadata indicates multiple animation-effect options corresponding to the digital graphic 122, with each animation-effect option corresponding to an animation effect. The metadata further indicates a dynamic attribute that triggers each animation effect.

Consistent with the metadata associated with the digital graphic 122, the digital communications system detects one of the dynamic attributes specified by the metadata. In this case, per the digital communications system's instructions, a gyroscope of the client device 100 detects a direction of the client device 100's rotation indicated by arrows 120a and 120b as a dynamic attribute. Relatedly, an accelerometer of the client device 100 detects a speed indicated by the arrows 120a and 120b as a magnitude of the dynamic attribute. The client device 100 in turn communicates the accelerometer data and the gyroscope data to the digital communications system as a particular direction of the client device 100's rotation (e.g., a rotation of 360 degrees in a counterclockwise direction around a perpendicular axis) and a particular speed. As the arrows 120a and 120b represent both a dynamic attribute and a magnitude of the dynamic attribute, the speed and direction of rotation may vary over time.

Upon receiving sensor data, such as data from the accelerometer and the gyroscope, the digital communications system optionally maps the sensor data to an animation-effect option from among the multiple animation-effect options included within metadata for a digital graphic. For example, in some embodiments, the metadata for a digital graphic points to an animation-effect database within the digital communications system that correlates dynamic attributes with animation-effect options. In such embodiments, the digital communications system uses the animation-effect database to map a detected dynamic attribute to an animation-effect option.

For example, in the embodiment shown in FIG. 1B, the metadata for the digital graphic 122 points to an animation-effect database within the digital communications system that correlates four possible dynamic attributes to four animation-effect options. Specifically, the animation-effect database indicates that (1) a rotation of the client device 100 in a clockwise direction around a perpendicular axis of the client device 100 corresponds to a first animation-effect option for a spinning animation in a clockwise direction around a perpendicular axis of the digital graphic 122, (2) a rotation of the client device 100 in a counterclockwise direction around the perpendicular axis of the client device 100 corresponds to a second animation-effect option for a spinning animation in a counterclockwise direction around the perpendicular axis of the digital graphic 122, (3) a rotation of the client device 100 in a clockwise direction around a longitudinal axis of the client device 100 corresponds to a third animation-effect option for a flipping animation in a clockwise direction around a longitudinal axis of the digital graphic 122, and (4) a rotation of the client device 100 in a counterclockwise direction around the longitudinal axis of the client device 100 corresponds to a fourth animation-effect option for a flipping animation in a counterclockwise direction around the longitudinal axis of the digital graphic 122. As indicated by FIG. 1B, upon receiving data from the gyroscope, the digital communications system maps the gyroscope data to the second animation-effect option for a spinning animation in a counterclockwise direction around the perpendicular axis of the digital graphic 122.

In response to mapping the dynamic attribute to an animation-effect option, in some embodiments, the digital communications system provides a digital graphic as an overlay on a visual media item—with an animation effect that corresponds to the mapped animation-effect option. As shown in FIG. 1B, for example, the digital communications system causes the client device 100 to present the digital graphic 122 with a spinning animation as an overlay on the live-video stream within the GUI 114. To create the animation effect, and as indicated by arrows 124a and 124b, the client device 100 presents a series of digital images of the digital graphic 122 that create the illusion that the digital graphic 122 is spinning in a counterclockwise direction around the perpendicular axis of the digital graphic 122.

In addition to providing the digital graphic 122 with a corresponding animation effect, the digital communications system adjusts the animation effect based on the magnitude of the detected dynamic attribute. As shown in FIG. 1B, as the client device 100 detects a faster speed from the accelerometer of the client device 100, the digital communications system increases the frequency of the spinning animation—with the client device 100 more rapidly presenting digital images of the digital graphic 122 that create a spinning illusion in proportion to the faster speed. By contrast, as the client device 100 detects a slower speed from the accelerometer of the client device 100, the digital communications system decreases the frequency of the spinning animation—with the client device 100 more slowly presenting digital images of the digital graphic 122 that create the spinning illusion in proportion to the slower speed.

Similar to the embodiment shown in FIG. 1A, the GUI 114 in FIG. 1B includes a live indicator 116 and a viewer indicator 118. The live indicator 116 and the viewer indicator 118 function in the same way as the live indicator 106 and the viewer indicator 108, respectively, except that the live-video stream originates from the client device 100 in FIG. 1B. In addition to transmitting the live-video stream, the digital communications system transmits an indication of the digital graphic 122 and an indication of its corresponding animation effect to other client devices presenting the live-video stream, including the client viewer devices. Upon receipt, the indication of the digital graphic 122 and the indication of the animation effect trigger the digital communications system to present the digital graphic 122 as an overlay on the live-stream video within graphical user interfaces of the other client devices.

Figure 1C:
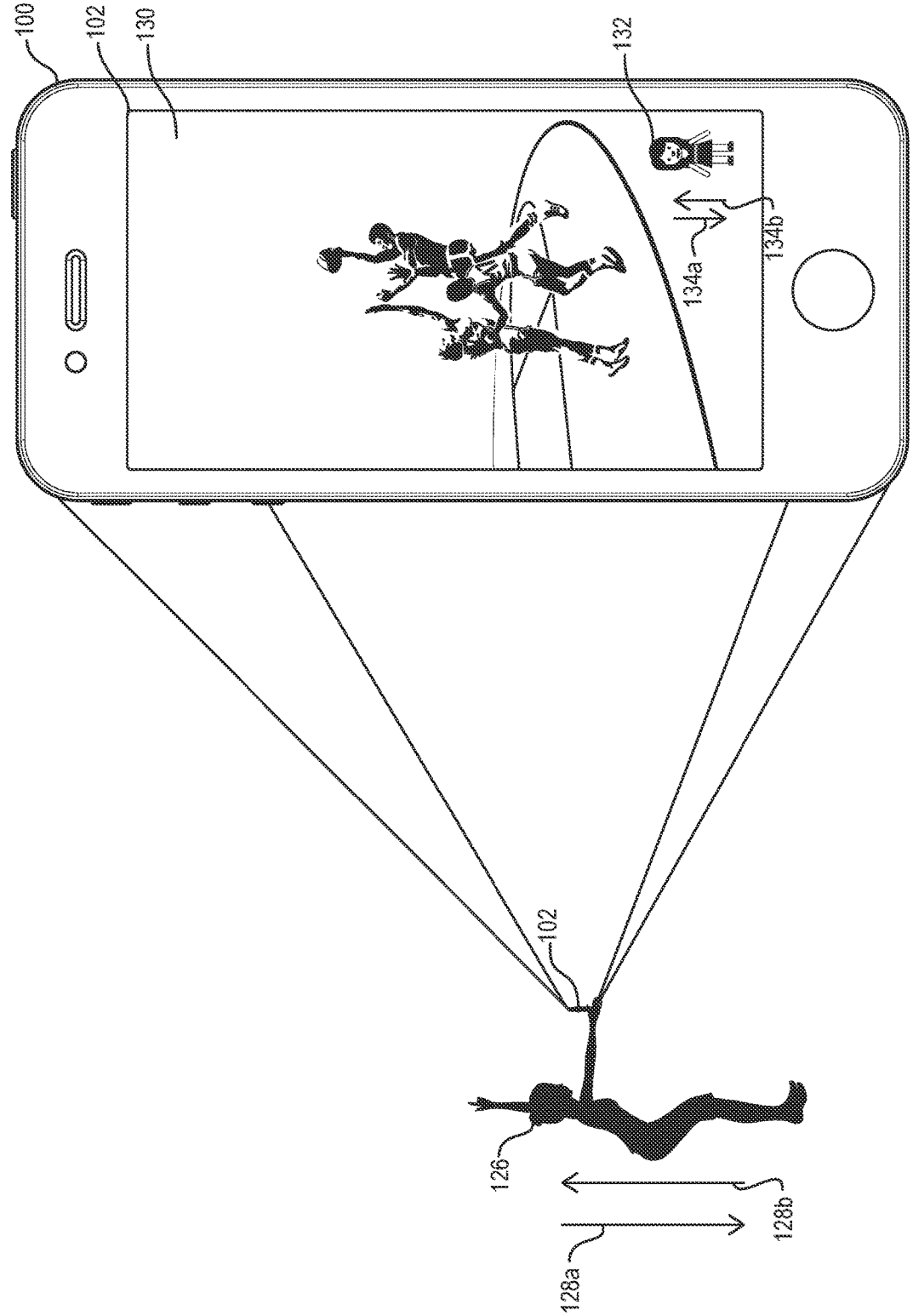
FIG. 1C illustrates a user and a user interface of a client device that comprises a digital graphic overlaid on a video with an animation effect based on sensor data from the client device in accordance with one or more embodiments.

The animation effects depicted in FIGS. 1A and 1B are merely exemplary. In some embodiments, the digital communications system provides several different animation effects based on sensor data from a client device. The digital communications system may provide a digital graphic with a variety of animation effects, including, but not limited to, a scaling animation that scales the digital graphic based on sensor data from a client device (e.g., enlarging or shrinking a digital graphic, such as a vector graphic of a milkshake, based on a detected shaking motion); a mimicking animation that mimics a motion of a client device based on sensor data (e.g., a running animation for an emoji that moves the emoji's legs faster or slower based on a speed detected by an accelerometer); and a coloring animation that changes a color of a digital graphic based on a change in light detected by the client device (e.g., a glowing animation that brightens a color of a digital graphic as light detected by the client device diminishes). FIG. 1C illustrates an additional embodiment of the digital communications system with one such animation effect.

As shown in FIG. 1C, the client device 110 and touch screen 102 perform the same functions as described above with reference to FIGS. 1A and 1B. In FIG. 1C, however, the digital communications system receives user input to overlay a digital graphic 132 on a video within a graphical user interface 130 ("GUI 130") of the client device 100. Specifically, the client device 100 detects and relays the user input from a user 126 shown in FIG. 1C. As indicated by arrows 128a and 128b, the user 126 jumps up and down while viewing the video on the client device 100. The jumping motion in turn causes the client device 100 to move up and down.

After receiving the user input to overlay the digital graphic 132, the digital communications system detects sensor data from the sensors of the client device 100. The sensor data indicates an up-and-down motion of the client device 100 on a perpendicular axis of the client device 100 at a particular speed. Moreover, the metadata associated with the digital graphic 132 includes a variety of animation-effect options that mimic the movement of the client device 100. After receiving the sensor data, the digital communications system maps the detected up-and-down motion of the client device 100 at the particular speed to a jumping animation for the digital graphic 132.

Upon mapping the up-and-down motion, the digital communications system causes the client device 100 to present the digital graphic 132 as an overlay on the video with the jumping animation. As indicated by arrows 134a and 134b, the client device 100 presents different digital images that change portions of the digital graphic 132—and change a location of the digital graphic 132 relative to the GUI 130—to create an illusion of the digital graphic 132 jumping.

As with the animated digital graphics described above, the digital communications system may likewise transmit an indication of the digital graphic 132 and an indication of the jumping animation from the client device 100 to other client devices. That transmission in turn causes the other client devices to present the digital graphic 132 as an overlay on the video with the jumping animation. The transmission likewise demonstrates how the digital communications system enables the user 126 to share her interaction with (and reaction to) the video with an animated version of the digital graphic 132.

Beyond providing a variety of animation effects, the digital communications system also detects dynamic attributes from a variety of sensors from a client device. For example, in addition to detecting sensor data from an accelerometer and a gyroscope, the digital communications system also detects sensor data from a light sensor or GPS receiver of a client device. In some embodiments, the digital communications system may, for example, present a digital graphic as an overlay with an animation effect based on a change in light detected by the light sensor or a change in location detected the GPS receiver. For example, the digital communications system may present a digital graphic of an avatar with an animation effect that creates an illusion of the avatar putting on sun glasses based on the light sensor detecting an increase of brightness above a threshold. As another example, the digital communications system may present a digital graphic with an animation effect of falling snow based on the GPS receiver detecting a certain increase in altitude or certain longitudinal and latitudinal coordinates indicating a cold climate.

In addition to sensor data, in some embodiments, a dynamic attribute may also include a motion of an object within a visual media item. As noted above, the digital communications system may detect people, pixels, or other objects that move within the visual media item. In some embodiments, the digital communications system detects a motion of an object relative to other objects or relative to its surroundings within a visual media item.

To detect a motion of an object within a visual media item, the digital communications system may use any available method of object-motion detection. For example, in some embodiments, the digital communications system uses background subtraction to detect a motion of an object within a visual media item. When using background subtraction, the digital communications system may create a reference background image and a foreground pixel map to detect a motion of an object within a video. In some such embodiments, the digital communications system subtracts a current image pixel-by-pixel from the reference background image, such as by averaging images over time in an initialization period. The digital communications system may, however, use a variety of background-subtraction techniques, including frame-differencing algorithms, mean-filter algorithms, Gaussian-average algorithms, or background-mixture models.

In addition to background subtraction, in some embodiments, the digital communications system uses temporal differencing to detect a motion of an object within a visual media item. When using temporal differencing, the digital communications system detects moving regions by taking a pixel-by-pixel difference of consecutive frames in a video sequence. The digital communications system, for instance, may determine a difference between consecutive frames of a video to detect motion from both a camera capturing a video and a moving object within the video. In some such embodiments, the digital communications system uses the temporal differencing techniques described by A. J. Lipton, H. Fujiyoshi, and R. S. Patil, "Moving Target Classification and Tracking from Real-Time Video," Proceedings of Workshop Applications of Computer Vision 129-136(1998), which is hereby incorporated by reference in its entirety.

While this disclosure describes examples of background subtraction and temporal differencing, the digital communications system may also, for example, use statistical approaches or optical-flow algorithms to detect a motion of an object within a visual media item. For example, the digital communications system may use any of the statistical approaches or optical-flow algorithms described in Soharab Hossain Shaikh et al., "Moving Object Detection Using Background Subtraction," 5-14(2014), which is hereby incorporated by reference in its entirety.

Figure 2A:
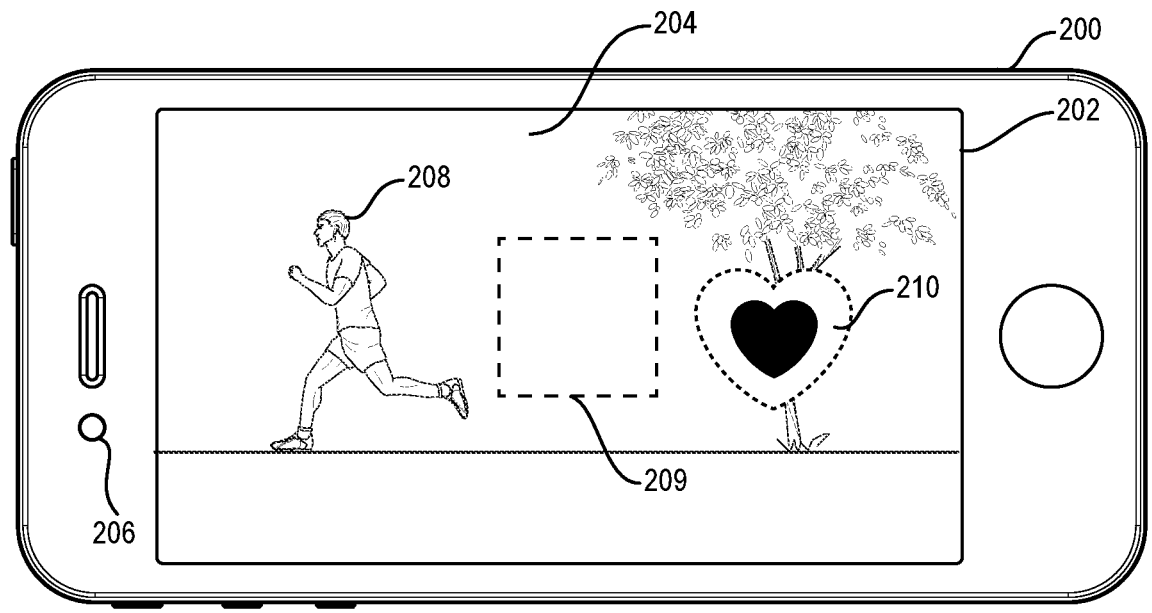
FIGS. 2A-2B illustrate user interfaces of a client device that comprise a digital graphic overlaid on a video with an animation effect based on a motion within the video in accordance with one or more embodiments.
Figure 2B:
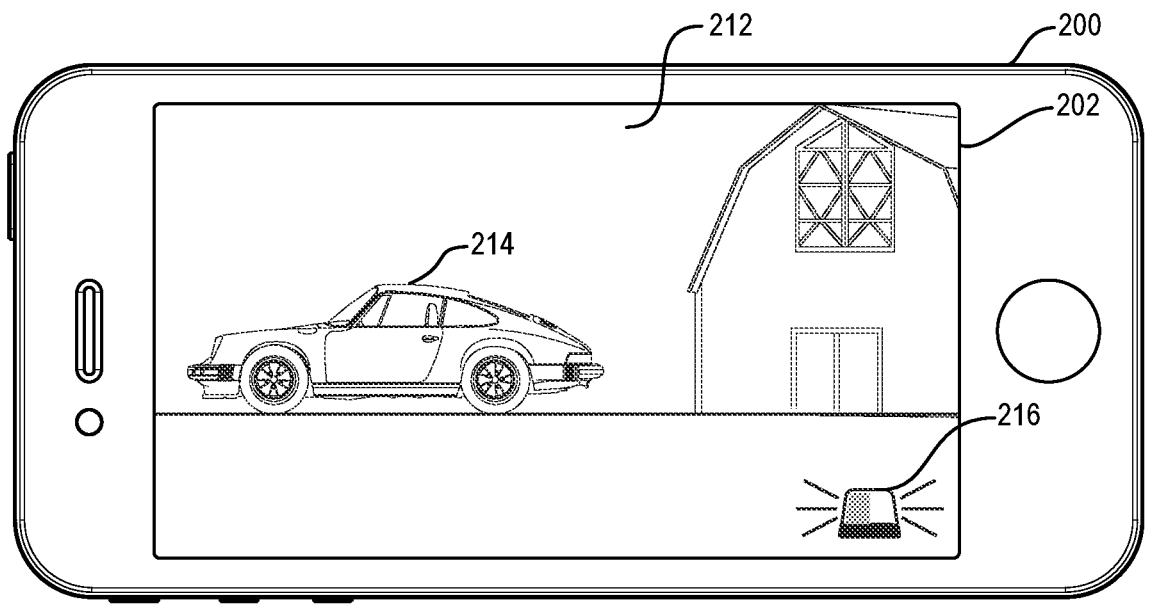

FIGS. 2A-2B provide examples of the digital communications system using a motion of an object within a visual media item as a dynamic attribute. Similar to some of the embodiments described above, FIGS. 2A and 2B illustrate graphical user interfaces of a client device that presents digital graphics as overlays on visual media items with animation effects for the digital graphics. To trigger the depicted animation effects, the digital communications system detects a motion of an object and then presents digital graphics with the animation effects based on the detected motion. As above, in some embodiments, the digital communications system causes a client device to present a digital graphic as an overlay initially without an animation effect and then—upon detecting a motion of an object— causes the client device to present the digital graphic with the animation effect.

As shown in both FIGS. 2A and 2B, the digital communications system provides digital graphics 210 and 216 as overlays on videos within graphical user interfaces 204 and 212 (respectively referred to as "GUI 204" and "GUI 212"). A client device 200 includes a touch screen 202 that facilitates presentation of the videos within the GUI 204 and the GUI 212. In FIG. 2A, the client device 200 records the video depicted in GUI 204 using a camera 206 and then transmits the video to other client devices. Accordingly, FIG. 2A depicts the video from the perspective of a user who originally captures the video. By contrast, in FIG. 2B, an additional client device (not shown) records and transmits the video depicted within the GUI 212 to the client device 200. Accordingly, FIG. 2B depicts the video from a viewer's perspective, where the viewer operates the client device 200.

In both FIGS. 2A and 2B, the digital communications system (e.g., a digital communications application running on the client device 200) includes instructions that, when executed by a processor of the client device 200, cause the client device 100 to present the different videos to the user within the GUI 204 and the GUI 212, respectively. Whereas the video shown within the GUI 204 includes a first object 208, the video shown within the GUI 212 includes a second object 212.

As depicted by FIG. 2A, the client device 200 receives user input from the user to overlay the digital graphic 210 on the video within the GUI 204. Upon receiving an indication of a user selection of the digital graphic 210 on the touch screen 202 (e.g., from a menu of digital graphics), the digital communications system identifies metadata associated with the digital graphic 210. In the embodiment depicted by FIG. 2A, the identified metadata indicates an animation effect for the digital graphic 210 and a dynamic attribute that triggers the animation effect.

Specifically, the metadata indicates a motion of an object within the video as a dynamic attribute that triggers the animation effect. In some embodiments, the metadata specifies the motion of a moving object closest to a center or focal point of the video, a fastest moving object within the video, or a biggest moving object within the video as the dynamic attribute that triggers an animation effect. Additionally, in some embodiments, the metadata further specifies one or more object types for the motion of an object, including, but not limited to, animals, balls, body parts, persons, or vehicles.

As further indicated by FIG. 2A, the metadata specifies a motion of a moving object closest to a center 209 within the GUI 204 as the dynamic attribute. As shown, the center 209 comprises dotted lines to indicate that the client device 200 optionally presents the center 209 within the GUI 204 for the user to view. In some embodiments, however, the client device 200 does not present a visual representation of the center 209 within the GUI 204.

Per the metadata associated with the digital graphic 210, the digital communications system detects a motion of the first object 208 and determines that the first object 208 is the closest moving object to the center 209. After detecting the first object 208—and per the digital communications system's instructions—the client device 200 presents the digital graphic 210 as an overlay within the GUI 204 with the animation effect. As specified by the metadata, the animation effect represents a beating heart.

The animation effect for the digital graphic 210 functions similarly to the animation effect for the digital graphic 110 of FIG. 1A, except that in FIG. 2A, the animation effect's frequency is based on the magnitude of the motion of the first object 208. Specifically, as the client device 200 detects a faster motion of the first object 208, the digital communications system increases the frequency of the beating animation—with the client device 200 more rapidly presenting large and small images of the digital graphic 210 in proportion to the faster speed. By contrast, as the client device 200 detects a slower motion of the first object 208, the digital communications system decreases the frequency of the beating animation—with the client device 200 more slowly presenting the large and small images of the digital graphic 200 in proportion to the slower speed.

Turning now to FIG. 2B, this figure illustrates a different animation effect from a viewer's point of view. As depicted by FIG. 2B, the client device 200 receives user input from the user to overlay the digital graphic 216 on the video within the GUI 212. Upon receiving an indication of a user selection of the digital graphic 216 on the touch screen 202 (e.g., from a menu of digital graphics), the digital communications system identifies metadata associated with the digital graphic 216. As depicted by FIG. 2B, the identified metadata indicates multiple animation-effect options corresponding to the digital graphic 216, with each animation-effect option corresponding to an animation effect. The metadata further indicates a dynamic attribute that triggers each animation effect.

By contrast to the metadata associated with the digital graphic 208 in FIG. 2A, the metadata associated with the digital graphic 216 in 2B specifies a motion of a fastest moving object within the GUI 214 as the dynamic attribute. The metadata associated with the digital graphic 216 further points to an animation-effect database within the digital communications system that correlates two possible dynamic attributes to two animation-effect options. Specifically, the animation-effect database indicates that (1) a motion of the detected object in a first direction (e.g., toward the right side of the GUI 212) corresponds to a first animation-effect option for a standard siren animation and (2) a motion of the detected object in a second direction (e.g., toward the left side of the GUI 212) corresponds to a second animation-effect option for a strobe-light siren animation. The strobe-light siren animation alternates colors at a higher frequency and has different colors than the standard siren animation.

As indicated by FIG. 2B, the digital communications system detects that a motion of the second object 214 is in the second direction and maps the motion of the second object 214 to the second animation-effect option for a strobe-light siren animation. After mapping the motion of the second object 214 to the second animation-effect option—and per the digital communications system's instructions—the client device 200 presents the digital graphic 216 as an overlay within the GUI 212 with the strobe-light siren animation. Specifically, the client device 200 interchangeably presents images of the digital graphic 216 with different alternating colors to create the illusion of a flashing strobe-light siren as the animation effect.

Similar to the embodiments shown in FIGS. 1A and 1B, the client device 200 either receives a live-stream video within the GUI 204 or transmits the live-stream video within the GUI 214. The digital communications system also transmits an indication of the digital graphic 210 and an indication of its corresponding animation effect—or alternatively an indication of the digital graphic 216 and an indication of its corresponding animation effect—to other client devices presenting a live-video stream. The indications of the digital graphics 210 and 216 and the indications of their corresponding animation effects respectively trigger the digital communications system to present the digital graphics 210 and 216 as overlays on the live-stream videos within graphical user interfaces of the other client devices.

The animation effects depicted in FIGS. 2A and 2B are merely exemplary. In some embodiments, the digital communications system provides several different animation effects based on a motion of an object within a visual media item. The digital communications system may provide a digital graphic with a variety of animation effects, including, but not limited to, a scaling animation that scales the digital graphic based on a motion of an object within a visual media item (e.g., enlarging or shrinking a digital graphic based on a detected size of an object as it moves within the visual media item); a mimicking animation that mimics a motion of a client device based a motion of an object within a visual media item (e.g., a running animation for an emoji that moves the emoji's legs faster or slower based on a speed a motion of a person within the visual media item); and a coloring animation that changes a color of a digital graphic based on a brightness of an object or background within the visual media item (e.g., a darkening animation that darkens a shade of a color of a digital graphic as a brightness of a background within the visual media item increases). FIG. 1C illustrates an additional embodiment of the digital communications system with one such animation effect.

Figure 3:
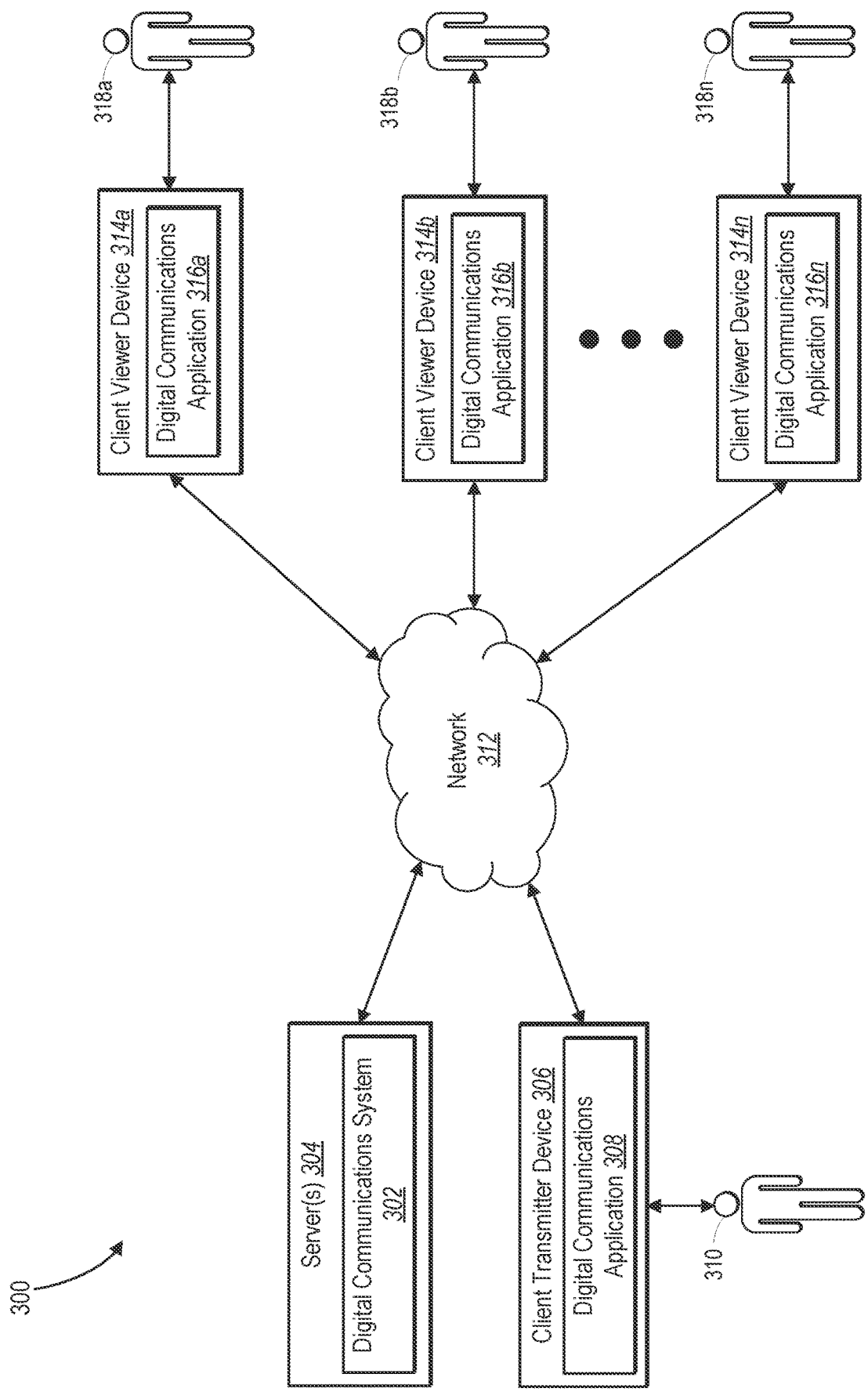
FIG. 3 illustrates a block diagram of an environment for implementing a system in accordance with one or more embodiments.

Turning now to FIG. 3, this figure illustrates a block diagram of one embodiment of a system environment 300 in which a digital communications system operates. The digital communications system can be embodied in one or more of a digital communications system 302 running on one or more servers 304 or in the digital communications applications 308, 316a-316n. The system environment 300 further includes a client transmitter device 306 and client viewer devices 314a-314n. As depicted in FIG. 1, the client transmitter device 306 has an associated user 310. Similarly, each of the client viewer devices 314a-314n have an associated user 318a-318n—with the user 318a associated with the client viewer device 314a, the user 318b associated with the client viewer device 314b, and the user 318n associated with the client viewer device 314n.

As further shown in FIG. 3, the user 310 captures and transmits a visual media item through the client transmitter device 306, such as a live-video stream. By contrast, the users 318a-318n view the transmitted visual media item on their respective client viewer devices 314a-314n. Although FIG. 3 illustrates a particular number of client viewer devices 314a-314n and a particular number of associated users 318a-318n, the system environment 300 may include any number of client viewer devices and any number of associated users.

The client transmitter device 306 and the client viewer devices 314a-314n can communicate with the digital communications system 302, including the server(s) 304, over a network 312. In one or more embodiments, the digital communications system 302 comprises a social networking system as described below with reference to FIGS. 9-10. In addition, the network 312 may represent a network or a collection of networks, such as the Internet, a corporate intranet, a local area network ("LAN"), or a combination of two or more such networks. The network 312 may also be any suitable network over which the client transmitter device 306 and the client viewer devices 314a-314n (or other components) may access the digital communications system 302 (or vice versa).

As further shown in FIG. 3, the server(s) 304 can enable the various functions, features, processes, methods, and systems described in this disclosure using, for example, instructions within the digital communications system 302. Additionally, or alternatively, the server(s) 304 coordinate with the client transmitter device 306 and/or the client viewer devices 314a-314n to perform or provide the various functions, features, processes, methods, and systems described in more detail below. Although FIG. 3 illustrates a particular arrangement of the digital communications system 302, server(s) 304, client transmitter device 306, network 312, and client viewer devices 314a-314n, various additional arrangements are possible. For example, the digital communications system 302 and the server(s) 304 may directly communicate with the client transmitter device 306 and/or the client viewer devices 314a-314n and thus bypass the network 312.

Generally, the client transmitter device 306 and client viewer devices 314a-314n can include any one of various types of client devices. For example, the client transmitter device 306 or client viewer devices 314a-314n can include a mobile device (e.g., a smart phone), tablet, laptop computer, desktop computer, television, or any other type of computing device as further explained below with reference to FIG. 8. Additionally, the server(s) 304 can include one or more computing devices including those explained below with reference to FIG. 8. Moreover, the server(s) 304, digital communications system 302, client transmitter device 306, network 312, and client viewer devices 314a-314n may communicate using any communication platforms and technologies suitable for transporting data and/or communication signals, including any known communication technologies, devices, media, and protocols supportive of data communications, examples of which are described below with reference to FIG. 9.

As an overview of the system environment 300, the server(s) 304 provide the client transmitter device 306 and client viewer devices 314a-314n access to the digital communications system 302 through the network 312. In one or more embodiments, when accessing the server(s) 304 of the digital communications system 302, the client transmitter device 306 transmits digitally encoded data to the digital communications system 302, such as digitally encoded data representing a visual media item or a digital graphic. The digital communications system 302 can provide, for example, a website that enables the user 310 to transmit a live-video stream, recorded video, digital image, GIF, or digital graphic or (in some embodiments) to post, send, edit, or delete digital messages within the digital communications system 302. By contrast, in one or more embodiments, when the client viewer devices 314a-314n access the server(s) 304 of the digital communications system 302 (e.g., through a web site), the client viewer devices 314a-314n receive a transmission of digitally encoded data from the digital communications system 302, such as digitally encoded data representing a live-video stream, digital graphic, post, instant message, or comment.

Alternatively, the client transmitter device 306 and the client viewer devices 314a-314n communicate with the server(s) 304 of the digital communications system 302 via a dedicated application on the client transmitter device 306 and the client viewer devices 314a-314n. In particular, the client transmitter device 306 and the client viewer devices 314a-314n each have an associated digital communications application—with a digital communications application 308 associated with the client transmitter device 306, a digital communications application 316a associated with the client viewer device 314a, a digital communications application 316b associated with the client viewer device 314b, and a digital communications application 316n associated with the client viewer device 314n.

In some embodiments, the digital communications application 308 and the digital communications applications 316a-316n comprise web browsers, applets, or other software applications (e.g., native applications) available to the client transmitter device 306 and the client viewer devices 314a-314n, respectively. In some instances, the digital communications system 302 provides data packets comprising the digital communications application 308 or the digital communications applications 316a-316n to the client transmitter device 306 and client viewer devices 314a-314n, respectively (e.g., by providing data representing a software application to a mobile device).

The client transmitter device 306 may launch the digital communications application 308 to facilitate interacting with the digital communications system 302. In some such embodiments, the digital communications application 308 coordinates communications between the client transmitter device 306 and the server(s) 304 such that, for example, the client transmitter device 306 transmits a visual media item to the digital communications system 302 (and the digital communications system 302 in turn transmits the visual media item to the client viewer devices 314a-314n) or access webpages of the digital communications system 302.

To facilitate user interaction with the digital communications system 302, the digital communications application 308 can comprise one or more graphical user interfaces associated with the digital communications system 302; receive indications of interactions of the user 310 with the graphical user interfaces; and perform various requests, queries, or responses to other user input. Similarly, the digital communications applications 316a-316n may perform the same functions for the client viewer devices 314a-314n (and the users 318a-318n) as the digital communications application 308 performs for the client transmitter device 306 (and the user 310).

For example, the graphical user interfaces of the digital communications application 308 and digital communications applications 316a-316n facilitate the transmission of both visual media items and indications of digital graphics as overlays on visual media items. Based on detecting an interaction between the user 310 and a graphical user interface (provided by the client transmitter device 306)—such as a selection of an option to record and transmit a video—the client transmitter device 306 transmits a video to the digital communications system 302 for individual transmission to a viewer or for broadcast to a group of viewers. Upon receiving the video, the digital communications system 302 transmits the video to one or more of the client viewer devices 314a-314n.

Additionally, based on detecting an interaction between the user 318a and a graphical user interface (provided by the client viewer device 314a)—such as a selection of a digital graphic—the client viewer device 314a overlays the digital graphic on the video and presents the digital graphic with an animation effect based on a detect dynamic attribute from the client viewer device 314a. In some embodiments, the client viewer device 314a also transmits an indication of the digital graphic and an indication of the animation effect to the digital communications system 302. The digital communications system 302 then transmits the indication of the digital graphic and the indication of the animation effect to the client transmitter device 306 for the client transmitter device 306 to present. As indicated above, in some embodiments, the client transmitter device 306 likewise receives an indication of a digital graphic, overlays the digital graphic on a visual media item with the indicated the animation effect.

Figure 4A:
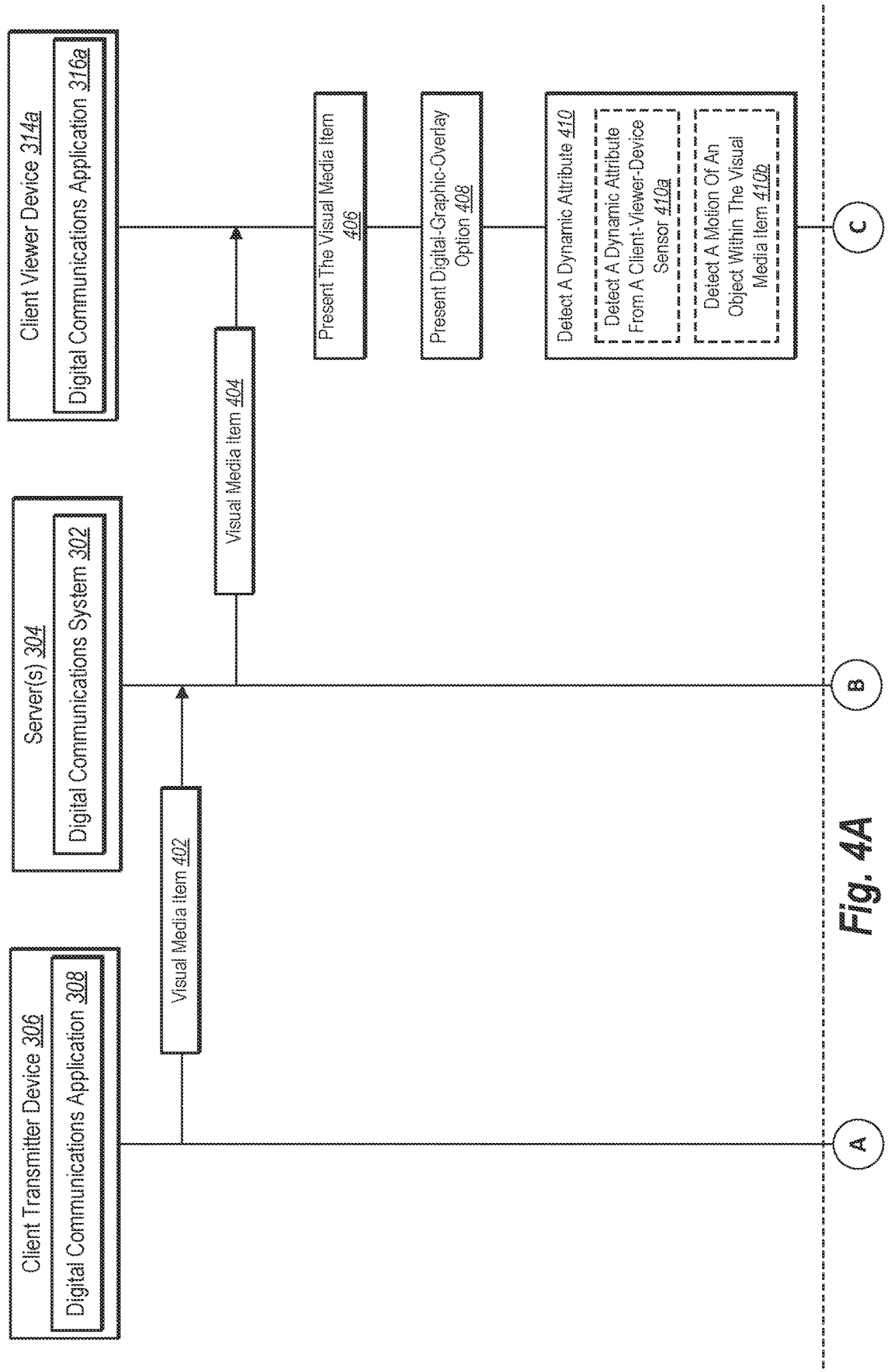
Figure 5A:
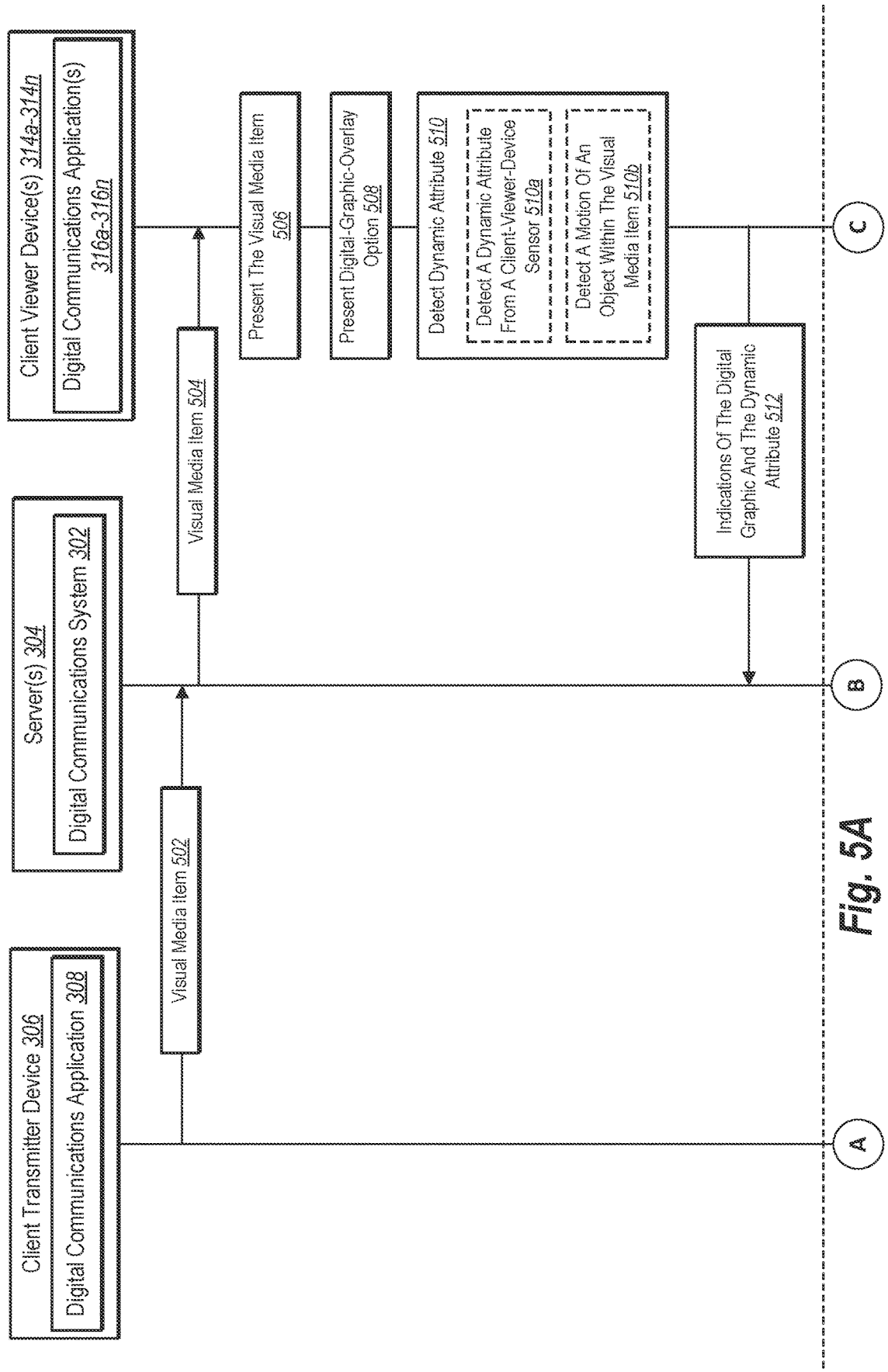
FIGS. 5A-5B illustrate a sequence-flow diagram of animating a digital graphic associated with a visual media item based on a detected dynamic attribute in accordance with one or more embodiments.
Figure 5B:
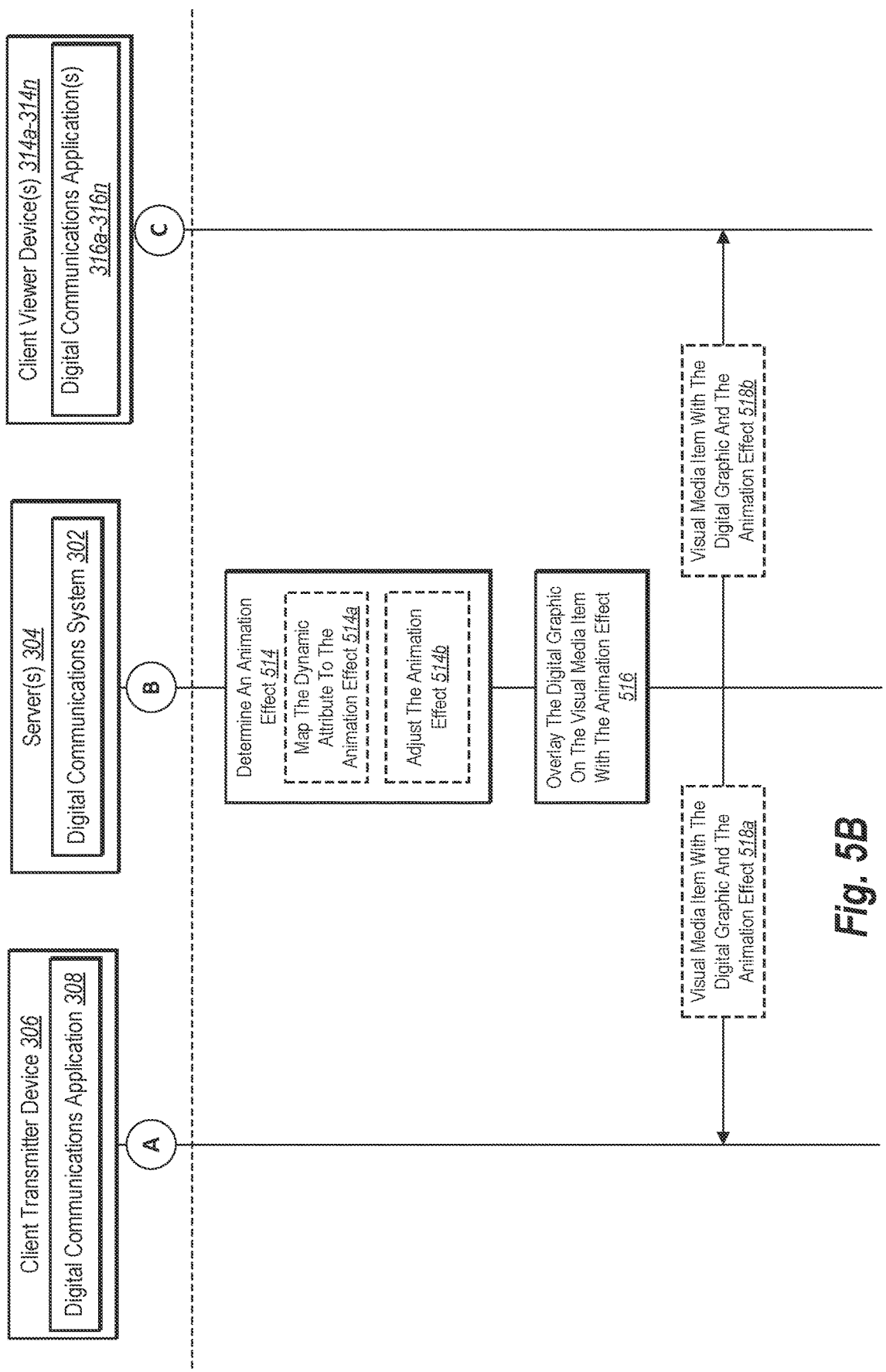

Turning now to FIGS. 4A-4B and FIGS. 5A-5B, these figures provide an overview of embodiments of the digital communications system that animate a digital graphic associated with a visual media item based on a detected dynamic attribute. Specifically, FIGS. 4A-4B illustrate a representation of a sequence of acts 402-418 that the digital communications system 302, the client transmitter device 306, or the client viewer device 314a perform, including transmitting a visual media item, detecting a dynamic attribute, and providing a digital graphic with an animation effect to one or both of the client viewer device 314a and the client transmitter device 306. Similarly, FIGS. 5A-5B illustrate a representation of a sequence of acts 502-522 that the digital communications system 302, the client transmitter device 306, or the client viewer devices 314a-314n perform, including transmitting a visual media item, detecting a dynamic attribute, and providing a digital graphic with an animation effect in a broadcast to the client transmitter device 306 and the client viewer devices 314a-314n.

Various aspects of the digital communications system perform the acts 402-418 shown in FIGS. 4A-4B or the acts 502-522 shown in FIGS. 5A-5B. In some embodiments, for example, the digital communications system 302 comprises computer-executable instructions that cause the server(s) 304 to perform one or more of the acts 402-418 or one or more of the acts 502-522. Similarly, in certain embodiments, the digital communications application 308 and the digital communications applications 316a-316n comprise computer-executable instructions that respectively cause the client transmitter device 306 and the client viewer devices 314a-314n to perform one or more of the acts 402-418 or one or more of the acts 502-522.

As above, rather than repeatedly describe the relationship between the instructions within the digital communications system 302 and the server(s) 304—or the relationship between the instructions within the digital communications application 308 or the digital communications applications 316a-316n and the client transmitter device 306 or the client viewer devices 314a-314n—the disclosure will primarily describe the digital communications system 302, the client transmitter device 306, or the client viewer devices 314a-314n as performing the acts 402-418 and the acts 502-522 as a shorthand for those relationships.

Turning back now to FIGS. 4A-4B, as shown in FIG. 4A, the client transmitter device 306 performs the act 402 of sending a visual media item to the digital communications system 302. The digital communications system 302 in turn performs the act 404 of transmitting the visual media item to the client viewer device 314a. Consistent with the disclosure above, in some embodiments, the client transmitter device 306 and the digital communications system 302 transmit the visual media item by transmitting a video, digital image, or other visual media item through the network 312.

After receiving the visual media item, the client viewer device 314a performs the act 406 of presenting the visual media item. For example, the client viewer device 314a may present the visual media item within a graphical user interface of the digital communications application 316a. In some embodiments, the client viewer device 314a presents the visual media item in a graphical user interface that fills a screen of the client viewer device 314a, such as the videos illustrated in FIGS. 1A-2B. By contrast, in some embodiments, the client viewer device 314a presents the visual media item in a portion of a screen, such as when the client viewer device 314a presents the visual media item as part of a messaging thread.

In addition to presenting the visual media item, the client viewer device 314a performs the act 408 of presenting a digital-graphic-overlay option. For example, the client viewer device 314a may present a digital-graphic-overlay option through a menu of digital graphics within a graphical user interface. In some embodiments, the menu includes digital graphics and corresponding selectable-options for each digital graphic. Upon receiving an indication that one of the digital graphics has been selected, the digital communications application 316a causes the client viewer device 314a to overlay the selected digital graphic on the visual media item with an animation effect, as described further below.

As further shown in FIG. 4A, after presenting a digital-graphic-overlay option, the client viewer device 314a performs the act 410 of detecting a dynamic attribute. For example, the client viewer device 314a optionally performs the act 410a of detecting a dynamic attribute from a client-viewer-device sensor or the act 410b of detecting a motion of an object within the visual media item. When performing the act 410a, the client viewer device 314a detects sensor data from a sensor of the client viewer device 314a, including, for example, an accelerometer, gyroscope, light sensor, or GPS receiver. The act 410a includes, but is not limited to, detecting sensor data from a sensor of a client device as described above with reference to FIGS. 1A-1C. By contrast, when performing the act 410b, the client viewer device 314a detects a motion of an object within the visual media item. The act 410b includes, but is not limited to, detecting a motion of an object within the visual media item using any of the object-motion-detection methods described above and the embodiments described with reference to FIGS. 2A-2B.

Turning now to FIG. 4B, after detecting a dynamic attribute, the client viewer device 314a performs the act 412 of presenting the digital graphic as an overlay with an animation effect. In performing the act 412, the client viewer device 314a may present a digital graphic with any animation effect described above, including, but not limited to, those depicted in and described with reference to FIGS. 1A-2C. For example, in some embodiments, the client viewer device 314a presents a digital graphic with an animation effect by sequentially presenting variations of a digital graphic as an overlay on a visual media item, where the variations of the digital graphic incrementally change portions of the digital graphic in a series of digital images.

As noted above, in some embodiments, a digital graphic corresponds to a single animation effect. In such embodiments, either the digital communications system 302 or the digital communications application 316a identifies the corresponding animation effect and then modifies a characteristic of the animation effect based on the detected dynamic attribute. For example, the digital communications system 302 or the digital communications application 316a can modify a frequency, duration, speed, size, etc. of the animation based on a magnitude of the detected dynamic attribute. The client viewer device 306 then presents the digital graphic with the modified animation effect on the visual media item. In other embodiments, however, a digital graphic corresponds to multiple animation effects. The digital communications system 302 may map a detected dynamic attribute to any one of these corresponding animation effects based on the dynamic attribute. Accordingly, in some embodiments, the client viewer device 314a optionally performs the act 412a of mapping the dynamic attribute to the animation effect.

In some embodiments, for example, the digital communications application 316a causes the client viewer device 314a to identify metadata associated with a selected digital graphic. As noted above, the metadata may include multiple animation-effect options or may point to an animation-effect database within the digital communications system 304 that correlates dynamic attributes with animation-effect options. Per the instructions of the digital communications application 314a, the client viewer device 314a maps the detected dynamic attribute to one of the animation-effect options, as described above in connection with the client devices in FIGS. 1B and 2B.

In addition to mapping a detected dynamic attribute to an animation effect, in some embodiments, the client viewer device 314a optionally performs the act 412b of adjusting the animation effect. For instance, in some embodiments, the client viewer device 314a adjusts a frequency of the animation effect based on a magnitude of the dynamic attribute. Depending on the embodiment, the client viewer device 314a may adjust the frequency of the animation effect proportionally or inversely to the magnitude of the dynamic attribute. For example, as a speed of a detected motion of the client viewer device 314a or a detected motion of an object within a visual media item increases or decreases, the client viewer device 314a adjusts the animation effect to proportionally increase or decrease in speed. As another example, in some embodiments, as a path or trajectory of a detected motion of the client viewer device 314a or a detected motion of an object within a visual media item increases or decreases, the client viewer device 314a adjusts the animation effect to proportionally increase or decrease a path or trajectory of an animation effect that mimics the detected motion of the client viewer device 314a or the detect motion of an object within a visual media item.

In addition to adjusting an animation effect based on a magnitude of the dynamic attribute, in some embodiments, the digital communications application 308 causes the client viewer device 314a to adjust the animation effect based on additional sensor data. For example, in some embodiments, the client viewer device 314a may map a detected dynamic attribute to an animation effect and then alter the animation effect based on detected sensor data from a light sensor or GPS receiver. The metadata associated with a digital graphic may, for example, specify a different version of an animation effect based on a brightness of light detected by a light sensor or a position detected by a GPS receiver. In one such example, the metadata specifies one variation of an animation effect for a digital graphic when sensor data from a light sensor indicates the client viewer device 314a is outdoors and another variation of an animation effect for a digital graphic when sensor data from a light sensor indicates the client viewer device 314a is indoors (e.g., an animation effect for an emoji with digital sunglasses outdoors and the same animation effect for the emoji without digital sunglass indoors). In another example, the metadata specifies one variation of an animation effect for a city or other location (e.g., an animation for a specific sports team or weather associated with a location) and another variation of an animation effect for a different city or other location (e.g., a different animation for a different sports team or weather associated with a different location).

As noted above, in addition to presenting the digital graphic as an overlay with an animation effect, in some embodiments, the client viewer device 314a communicates the selected digital graphic and data that triggers the corresponding animation effect to another client device. As shown in FIG. 4B, for example, the client viewer device 314a optionally performs the act 414 of sending indications of the digital graphic and the animation effect to the digital communications system 302, and the digital communications system 302 optionally performs the act 416 of sending indications of the digital graphic and the animation effect to the client transmitter device 306. For the acts 414 and 416, the indications may be an alphanumeric code, metadata, binary code, or some other indicator that corresponds to a selected digital graphic and a corresponding animation effect. For example, the indication for the animation effect may comprise an indication of sensor data (e.g., a speed from an accelerometer, orientation from a gyroscope) or an indication of a detected motion of an object within the visual media item that corresponds to the animation effect (e.g., coordinates of pixels representing a moving object).

In some embodiments, the client viewer device 314a and the digital communications system 302 repeatedly send indications of the digital graphic and/or indications of the animation effect to adjust the animation effect based on changes in the dynamic attribute. Regardless of the format or periodicity of the indications, the indication of the digital graphic and the indication of the animation effect include encoded data that cause a client device to present the digital graphic as an overlay on the visual media item with the animation effect. In other words, these indications enable one client device to effectively send a digital graphic and corresponding animation effect to another client device.

As further shown in FIG. 4B, upon receipt of the indications of the digital graphic and the animation effect, the client transmitter device 306 optionally performs the act 418 of presenting the digital graphic as an overlay with the animation effect. For example, in some embodiments, the client transmitter device 306 detects user settings that cause it to present digital graphics selected by users associated with other client devices (e.g., client viewer devices 314a-314n). For instance, in some cases, the digital communications application 308 receives an indication of a user setting from the user 310 that directs the client transmitter device 306 to present digital graphics selected by a specific user (e.g., the user 318a) with corresponding animation effects. Additionally, in some embodiments, the digital communications application 308 receives an indication of a user setting from the user 310 that directs the client transmitter device 306 to present digital graphics selected by any of the users 318a-318n with corresponding animation effects.

As described above for the acts 402-418, the client viewer device 314a performs various actions, such as presenting a digital-graphic-overlay option, receiving a selection of a digital graphic, presenting the digital graphic with an animation effect, and transmitting indications of the digital graphic and animation effect to the client transmitter device 306. In some embodiments, however, the opposite is also (or exclusively) true. In some embodiments, the client transmitter device 306 performs various actions with respect to a digital graphic, such as presenting a digital-graphic-overlay option, receiving a selection of a digital graphic, presenting the digital graphic with an animation effect, and transmitting indications of the digital graphic and animation effect to the client viewer device 314a.

Turning now to FIGS. 5A-5B, as shown in FIG. 5A, the client transmitter device 306 performs the act 502 of sending a visual media item to the digital communications system 302. The digital communications system 302 in turn performs the act 504 of transmitting the visual MEDIA item to the client viewer devices 314a-314n. In general, when performing the acts 502 and 504, the client transmitter device 306 transmits the visual media item through the digital communications system 302 in a broadcast to the client viewer devices 314a-314n. As suggested by their descriptions in the figures, the acts 502 and 504 in FIG. 5A respectively correspond to the acts 402 and 404 in FIG. 4A. Accordingly, the description and embodiments set forth above for the acts 402 and 404 respectively apply to the acts 502 and 504—except that the latter acts involve broadcasting the visual media item to all the client viewer devices 314a-314n instead of transmitting the visual media item to the client viewer device 314a exclusively.

After receiving the visual media item, one or more of the client viewer devices 314a-314n perform the act 506 of presenting the visual media item, the act 508 of presenting a digital-graphic-overlay option, and the act 510 of detecting a dynamic attribute. As further shown in FIG. 5A, one or more of the client viewer devices 314a-314n optionally perform the acts 510a of detecting a dynamic attribute from a client-viewer-device sensor or the act 510b of detecting a motion of an object within the visual media item. As suggested by their descriptions in the figures, the acts 506, 508, 510, 510a, and 510b in FIG. 5A respectively correspond to the acts 406, 408, 410, 410a, and 410b in FIG. 4A. Accordingly, the description and embodiments set forth above for the acts 406, 408, 410, 410a, and 410b respectively apply to the acts 506, 508, 510, 510a, and 510b— except that the latter acts involve one or more of the client viewer devices 314a-314n performing the latter acts.

In contrast to the embodiments illustrated by FIGS. 4A and 4B, in some embodiments, the digital communications system 302 determines which animation effect to provide based on data from one of the client viewer devices 314a-314n. As shown in FIG. 5A, for example, one or more of the client viewer devices 314a-314n performs the act of sending indications of the digital graphic and the dynamic attribute. These indications represent the digital graphic selected as part of the act 508 and the dynamic attribute detected as part of the act 510. Similar to the indications described above, the indications sent as part of the act 512 may be alphanumeric code, metadata, binary code, or some other indicator that corresponds to a selected digital graphic and a detected dynamic attribute. For example, the indication of the dynamic attribute may comprise an indication of sensor data (e.g., a speed from an accelerometer, orientation from a gyroscope) or an indication of a detected motion of an object within the visual media item (e.g., coordinates of pixels representing a moving object).

In some embodiments, one or more of the client viewer devices 314a-314n repeatedly send indications of the digital graphic and/or indications of the detected dynamic attribute to the digital communications system 302. By repeatedly sending such indications, the client viewer devices 314a-314n provide the digital communications system 302 with data to adjust a selected animation effect. Accordingly, in some embodiments, the digital communications system 302 dynamically adjusts a selected animation effect based on updated data sent from one or more of the client viewer devices 314a-314n.

Turning now to FIG. 5B, upon receipt of the indications of the digital graphic and the dynamic attribute, the digital communications system 302 performs the act 514 of determining an animation effect. Consistent with the disclosure above, in some embodiments, the digital communications system 302 identifies a single animation effect that corresponds to the dynamic attribute (i.e., the dynamic attribute identified in the indication of the dynamic attribute). In other embodiments, however, the digital communications system 302 maps the dynamic attribute to one of multiple animation effects.

As further shown in FIG. 5B, the digital communications system 302 optionally performs the act 514a of mapping the dynamic attribute to the animation effect and the act 514b of adjusting the animation effect. As suggested by their descriptions in the figures, the optional acts 514a and 514b in FIG. 5A respectively correspond to the optional acts 412a and 412b in FIG. 4A. Accordingly, the description and embodiments set forth above for the acts 412a and 412b respectively apply to the acts 514a and 514b. In contrast to the acts 412a and 412b, however, the acts 514a and 514b involve the digital communications system 302 mapping one or more dynamic attributes to one or more corresponding animation effects based on indications of digital graphics and dynamic attributes received from the client viewer devices 314a-314n. Moreover, in contrast to the acts 412a and 412b, the acts 514a and 514b involve the digital communications system 302 adjusting animation effects based on the magnitude of a dynamic attribute or additional sensor data detected by one or more of the client viewer devices 314a-314n.

Act 514a can involve, based on the detected dynamic attribute, the client viewer device mapping the dynamic attribute to an animation effect. For example, based on the type of dynamic attribute, the client viewer device can identify one of a plurality of animation effects associated with the selected digital graphic. More particular, metadata associated with the digital graphic can associate a given type of dynamic attribute (device rotation, device acceleration, device motion sequences that move up and down side to side, etc.) with one of a plurality of animation effects.

Act 514b can involve, based on the detected dynamic attribute, a client viewer device adjusting the animation effect. For example, based on the magnitude of the dynamic attribute, the client viewer device can adjust a characteristic of the animation effect. In particular, metadata associated with the digital graphic can associate a given range or value of a detected dynamic attribute with a value of a characteristic for the animation effect. For example, the faster the detected speed of an object in viewfinder, or the faster the client device accelerates, the faster the animation effect.

In addition to determining an animation effect, the digital communications system 302 also alters the visual media item to include one or more digital graphics with animation effects for broadcast to multiple client devices. As shown in FIG. 5B, for example, the digital communications system 302 performs the act 516 of overlaying the digital graphic on the visual media item with the animation effect. For example, the digital communications system 302 may overlay digital graphics on visual media items as shown within the graphical user interfaces illustrated by FIGS. 1A-2B.

After overlaying the digital graphic on the visual media item, the digital communications system 302 optionally performs the act 518a of sending the visual media item with the digital graphic and the animation effect to the client transmitter device 306 and optionally performs the act 518b of sending the visual media item with the digital graphic and the animation effect to one or more of the client viewer devices 314a-314n. The digital communications system 302 sometimes distributes the visual media item with digital graphics based on user settings or default settings of user accounts for the users associated with client devices. For example, in some embodiments, the digital communications system 302 detects user settings for the user account associated with the client transmitter device 306. These user settings cause the digital communications system 302 to send the visual media item with the selected digital graphics and corresponding animation effects to both the client transmitter device 306 and certain of the client viewer devices 314a-314n. In other embodiments, the digital communications system 302 detects default settings for the user account associated with the client transmitter device 306. These default settings cause the digital communications system 302 to send the visual media item with the selected digital graphics and corresponding animation effects to the client transmitter device 306 and all the client viewer devices 314a-314n.

Figure 6:
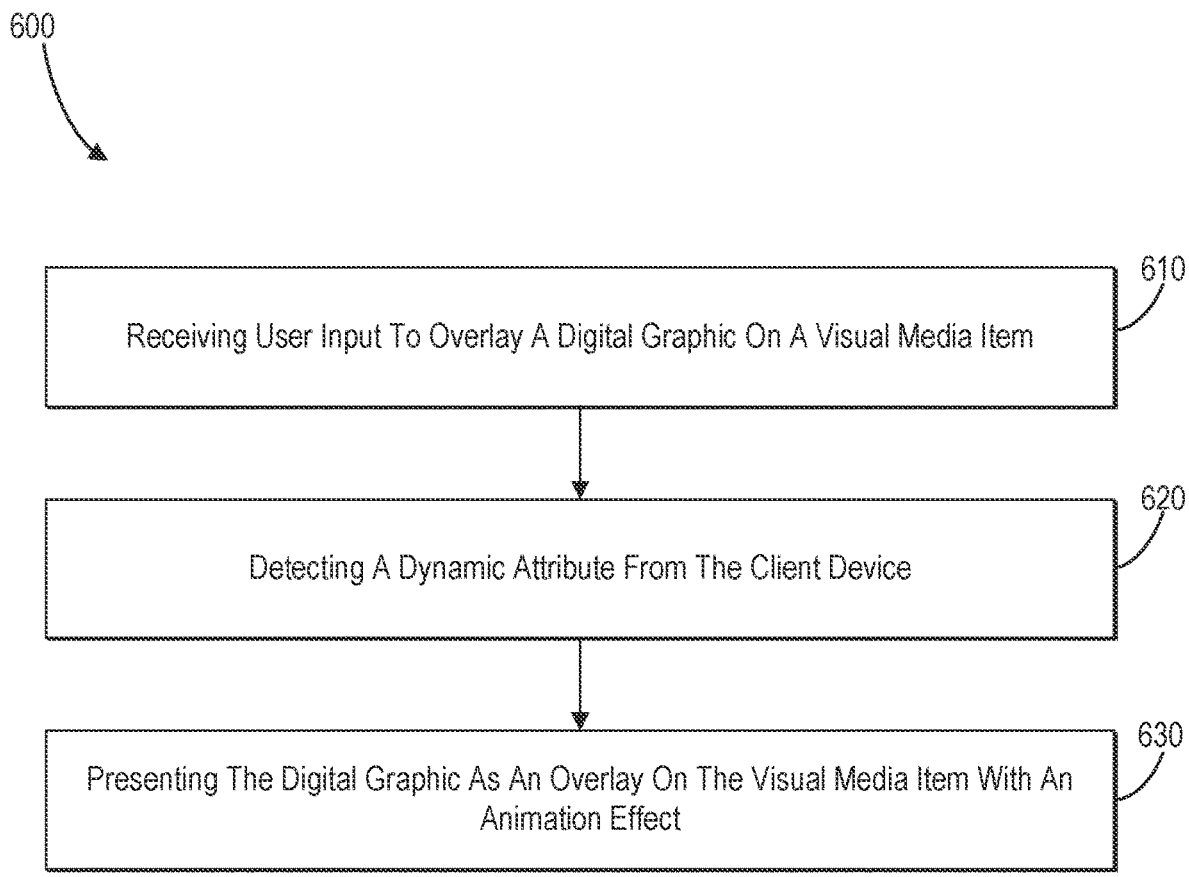
FIG. 6 illustrates a flowchart of a series of acts of animating a digital graphic associated with a visual media item based on a detected dynamic attribute in accordance with one or more embodiments.

Turning now to FIG. 6, this figure illustrates a flowchart of a series of acts 600 of animating a digital graphic associated with a visual media item based on a detected dynamic attribute in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown in FIG. 6, the acts 600 include an act 610 of receiving user input to overlay a digital graphic on a visual media item. In particular, in some embodiments, the act 610 includes receiving user input to overlay a digital graphic on a visual media item within a graphical user interface of a client device. Additionally, in some embodiments, receiving user input to overlay the digital graphic on the visual media item comprises receiving user input to overlay the digital graphic on a video within the graphical user interface of the client device.

As further shown in FIG. 6, the acts 600 include an act 620 of detecting a dynamic attribute from the client device. For example, in one or more embodiments, Additionally, in some embodiments, detecting the dynamic attribute from the client device comprises determining a magnitude of the dynamic attribute. As another example, in some embodiments, detecting the dynamic attribute from the client device comprises detecting the dynamic attribute from a sensor of the client device. Relatedly, in some embodiments, detecting the dynamic attribute from the client device comprises detecting the dynamic attribute from an accelerometer, gyroscope, light sensor, or Global Positioning System receiver of the client device.

By contrast, in some embodiments, detecting the dynamic attribute from the client device comprises detecting a motion of an object within the visual media item. In some such embodiments, detecting the dynamic attribute from the client device comprises detecting a pattern of the object's motion within the visual media item. Additionally, in one or more embodiments, detecting the motion of the object within the visual media item comprises detecting one or more of: a speed of the object as the object moves within the visual media item; a jumping motion of the object within the visual media item; a rotational motion of the object within the visual media item; a running motion of a person within the visual media item; or a change in orientation of the object within the visual media item.

As further shown in FIG. 6, the acts 600 include an act 630 of presenting the digital graphic as an overlay on the visual media item with an animation effect. In particular, the act 630 includes presenting the digital graphic as an overlay on the visual media item with an animation effect based on the dynamic attribute.

Additionally, in some embodiments, presenting the digital graphic as the overlay on the visual media item with the animation effect comprises presenting the digital graphic as the overlay on the video with the animation effect based on the dynamic attribute. Relatedly, in some embodiments, presenting the digital graphic as the overlay on the visual media item with the animation effect comprises presenting the digital graphic as the overlay on the visual media item with the animation effect having a frequency based on the magnitude of the dynamic attribute. Moreover, in some embodiments, presenting the digital graphic as the overlay on the visual media item with the animation effect based on the dynamic attribute comprises mapping the dynamic attribute to the animation effect, the animation effect being one of a plurality of animation effects associated with the digital graphic.

Additionally, in some embodiments presenting the digital graphic as the overlay on the visual media item with the animation effect comprises identifying metadata associated with the digital graphic comprising a plurality of animation-effect options; mapping the dynamic attribute to an animation-effect option of the plurality of animation-effect options, the animation-effect option corresponding to the animation effect; and in response to mapping the dynamic attribute to the animation-effect option, presenting the digital graphic as the overlay on the visual media item with the animation effect.

In addition to the acts 610-630, in some embodiments, the acts 600 further includes transmitting, from the client device to another client device, an indication of the digital graphic and an indication of the animation effect, the indications causing the digital graphic to appear as the overlay on the visual media item with the animation effect.

Figure 7:
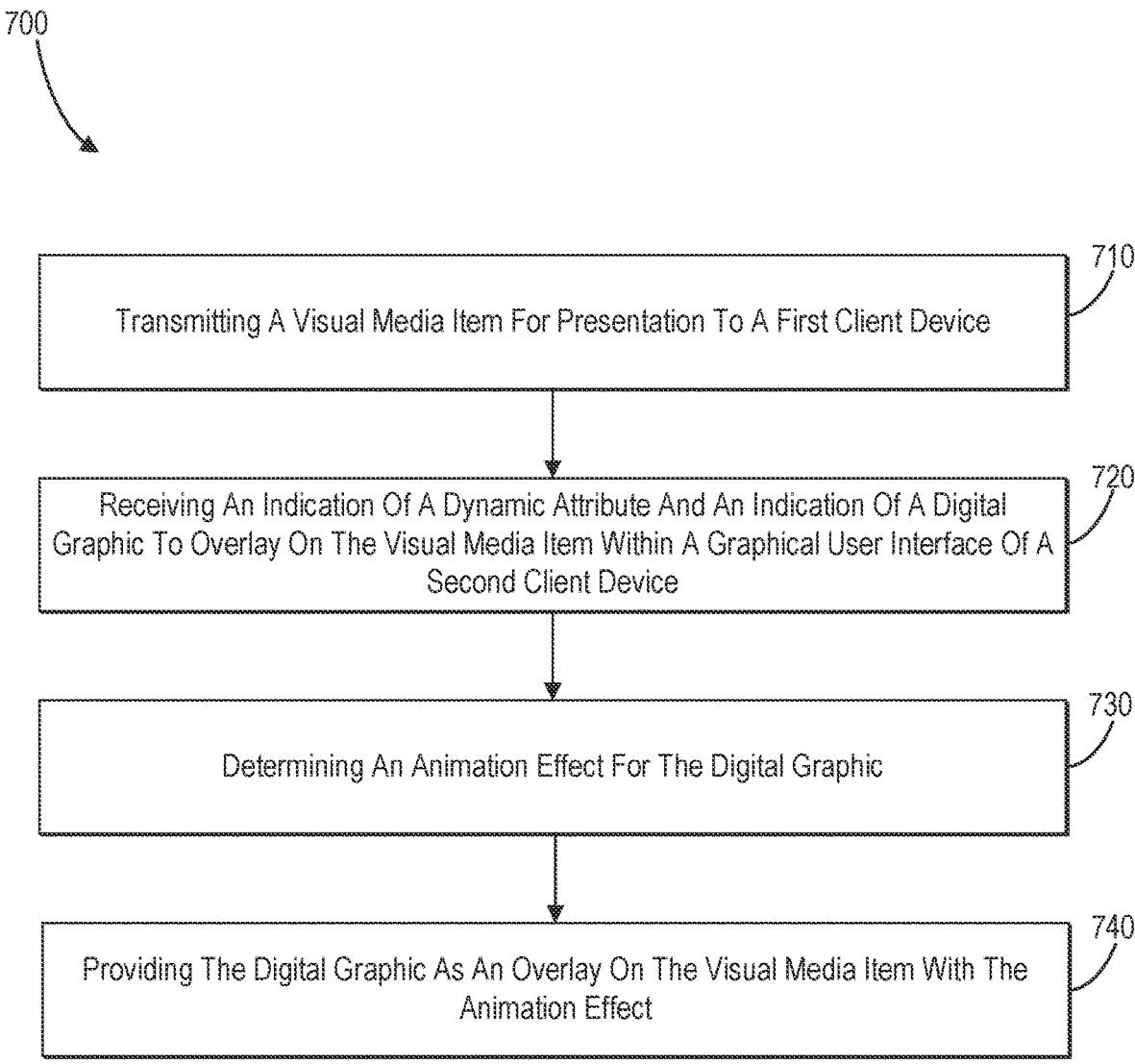
FIG. 7 illustrates a flowchart of a series of acts of animating a digital graphic associated with a visual media item based on a detected dynamic attribute in accordance with one or more embodiments.

Turning now to FIG. 7, this figure illustrates a flowchart of a series of acts 700 in of animating a digital graphic associated with a visual media item based on a detected dynamic attribute in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown in FIG. 7, the acts 700 include an act 710 of transmitting a visual media item for presentation to a first client device. As further shown in FIG. 7, the acts 700 include an act 720 of receiving an indication of a dynamic attribute and an indication of a digital graphic to overlay on the visual media item within a graphical user interface of a second client device. In particular, the act 720 includes receiving, from the first client device, an indication of a dynamic attribute and an indication of a digital graphic to overlay on the visual media item within a graphical user interface of a second client device. For example, in one or more embodiments, receiving the indication of the digital graphic to overlay on the visual media item comprises receiving the indication of a vector graphic to overlay on the visual media item.

As further shown in FIG. 7, the acts 700 include an act 730 of determining an animation effect for the digital graphic. In particular, the act 730 includes determining an animation effect for the digital graphic based on the dynamic attribute. In some embodiments, determining the animation effect for the digital graphic based on the dynamic attribute comprises determining that the dynamic attribute corresponds to an animation effect that changes a portion of the digital graphic. Relatedly, in some embodiments, determining the animation effect for the digital graphic based on the dynamic attribute comprises: identifying a plurality of animation effects associated with the digital graphic, the plurality of animation effects comprising the animation effect;

and mapping the dynamic attribute to the animation effect of the plurality of animation effects.

Additionally, in some embodiments, determining the animation effect for the digital graphic based on the dynamic attribute comprises determining that the dynamic attribute corresponds to: a scaling animation that scales the digital graphic based on a motion of an object within the visual media item detected by the client device or sensor data received by the client device; a mimicking animation that mimics a motion of an object within the visual media item or a motion detected by the client device based on sensor data; and a coloring animation that changes a color the digital graphic based on a brightness of an object or background within the visual media item or a change in light detected by the client device.

As further shown in FIG. 7, the acts 700 include an act 740 of providing the digital graphic as an overlay on the visual media item with the animation effect. For example, in some embodiments, providing the digital graphic as an overlay on the visual media item with the animation effect comprises providing the vector graphic as an overlay on the visual media item with the animation effect. As another example, in some embodiments, providing the digital graphic as an overlay on the visual media item comprises providing the digital graphic as an overlay on the visual media item with the animation effect that changes a portion of the digital graphic.

In addition to the acts 710-740, in some embodiments, the acts 700 include receiving an indication that a magnitude of the dynamic attribute has changed; and based on the indication that the magnitude of the dynamic attribute has changed, adjusting the animation effect of the digital graphic.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
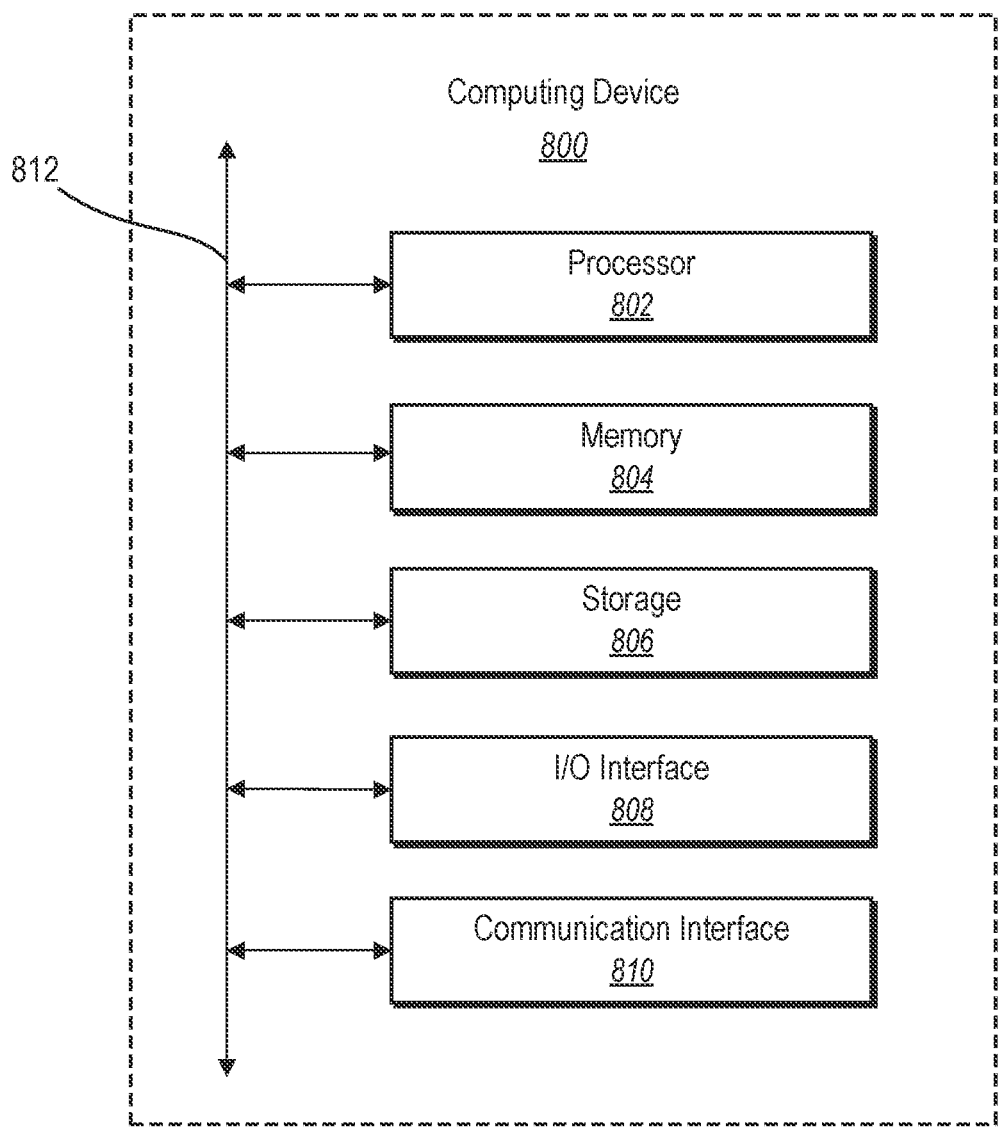
FIG. 8 illustrates a block diagram of an example computing device in accordance with one or more embodiments.

FIG. 8 illustrates a block diagram of exemplary computing device 800 that may be configured to perform one or more of the processes described above. One will appreciate that one or more computing devices such as the computing device 800 may implement the digital communications system described above. Furthermore, any of the devices 100, 200, 304, 306, 314a-314n can be a computing device 800. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers ("TLBs"). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive ("HDD"), flash memory, an optical disc, a magneto-optical disc, magnetic tape, or a Universal Serial Bus ("USB") drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

As mentioned above, in one or more embodiments, the digital communications system comprises a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 9:
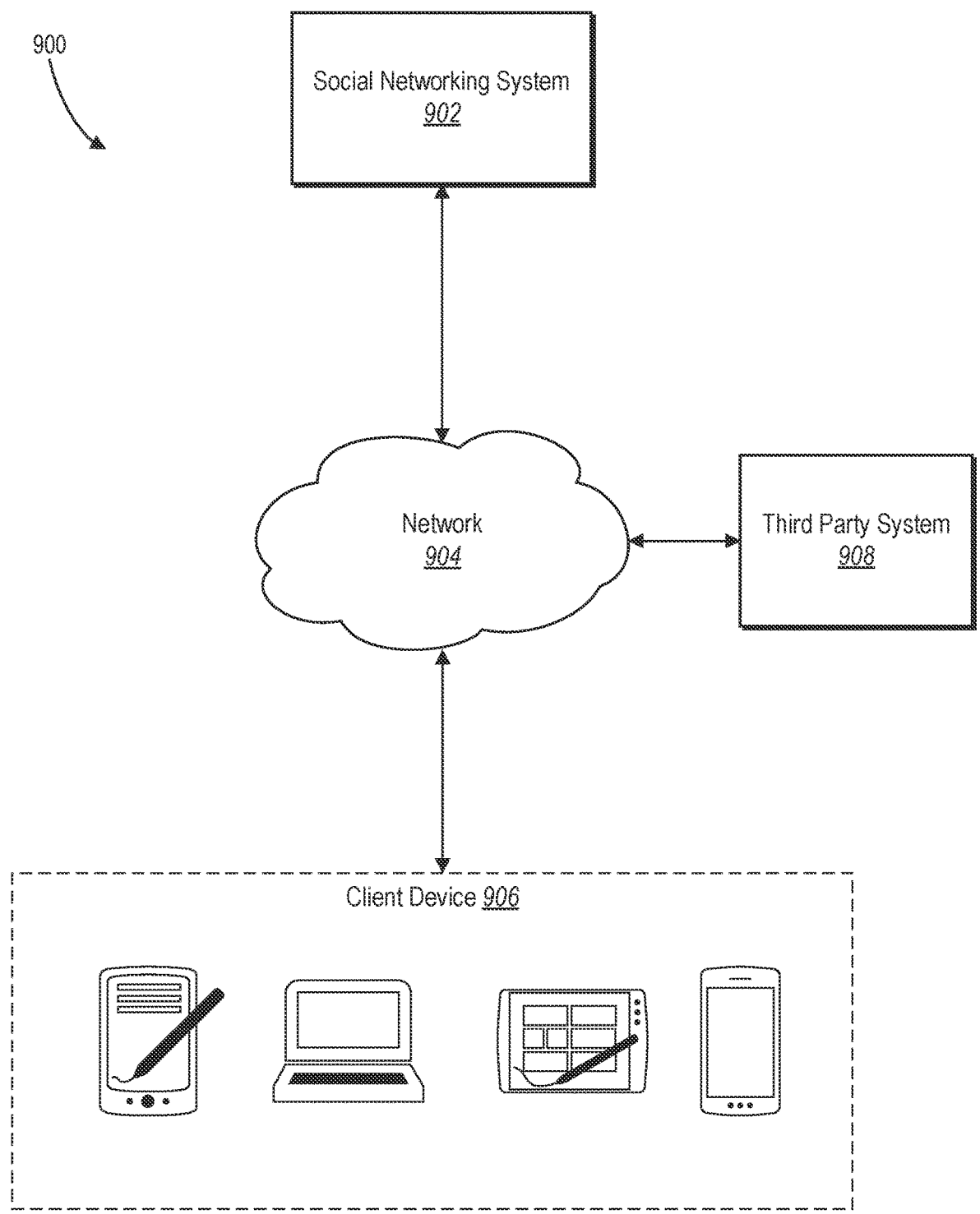
FIG. 9 illustrates a network environment of a social networking system according to one or more embodiments.

FIG. 9 illustrates an example network environment 900 of a social-networking system. Network environment 900 includes a client device 906, a social networking system 902, and a third-party system 908 connected to each other by a network 904. Although FIG. 9 illustrates a particular arrangement of client device 906, social networking system 902, third-party system 908, and network 904, this disclosure contemplates any suitable arrangement of client device 906, social networking system 902, third-party system 908, and network 904. As an example and not by way of limitation, two or more of client device 906, social networking system 902, and third-party system 908 may be connected to each other directly, bypassing network 904. As another example, two or more of client device 906, social networking system 902, and third-party system 908 may be physically or logically co-located with each other in whole or in part. Moreover, although FIG. 9 illustrates a particular number of client devices 906, social networking systems 902, third-party systems 908, and networks 904, this disclosure contemplates any suitable number of client devices 906, social networking systems 902, third-party systems 908, and networks 904. As an example and not by way of limitation, network environment 900 may include multiple client devices 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, social networking system 902, and third-party system 908 to communication network 904 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 9. A client device 906 may enable a network user at client device 906 to access network 904. A client device 906 may enable its user to communicate with other users at other client devices 906.

In particular embodiments, client device 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system 908), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In particular embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, a social networking system 902, or a third-party system 908 to manage, retrieve, modify, add, or delete, the information stored in data store.

In particular embodiments, social networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In particular embodiments, users may join the online social network via social networking system 902 and then add connections (e.g., relationships) to a number of other users of social networking system 902 whom they want to be connected to. Herein, the term "friend" may refer to any other user of social networking system 902 with whom a user has formed a connection, association, or relationship via social networking system 902.

In particular embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In particular embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces ("API") or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In particular embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client device 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client device 906. Posts may include data such as status updates or other textual data, location information, photos, videos, links, music or other similar data or media. Content may also be added to social networking system 902 by a third-party through a "communication channel," such as a newsfeed or stream.

In particular embodiments, social networking system 902 may include a variety of servers, sub-systems, programs, modules, logs, and data stores. In particular embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In particular embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client devices 906 or one or more third-party system 908 via network 904. The web server may include a mail server or other messaging functionality for receiving and routing messages between social networking system 902 and one or more client devices 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client devices 906 associated with users. Advertisement-pricing modules may combine social information, the current time, location information, or other suitable information to provide relevant advertisements, in the form of notifications, to a user.

Figure 10:
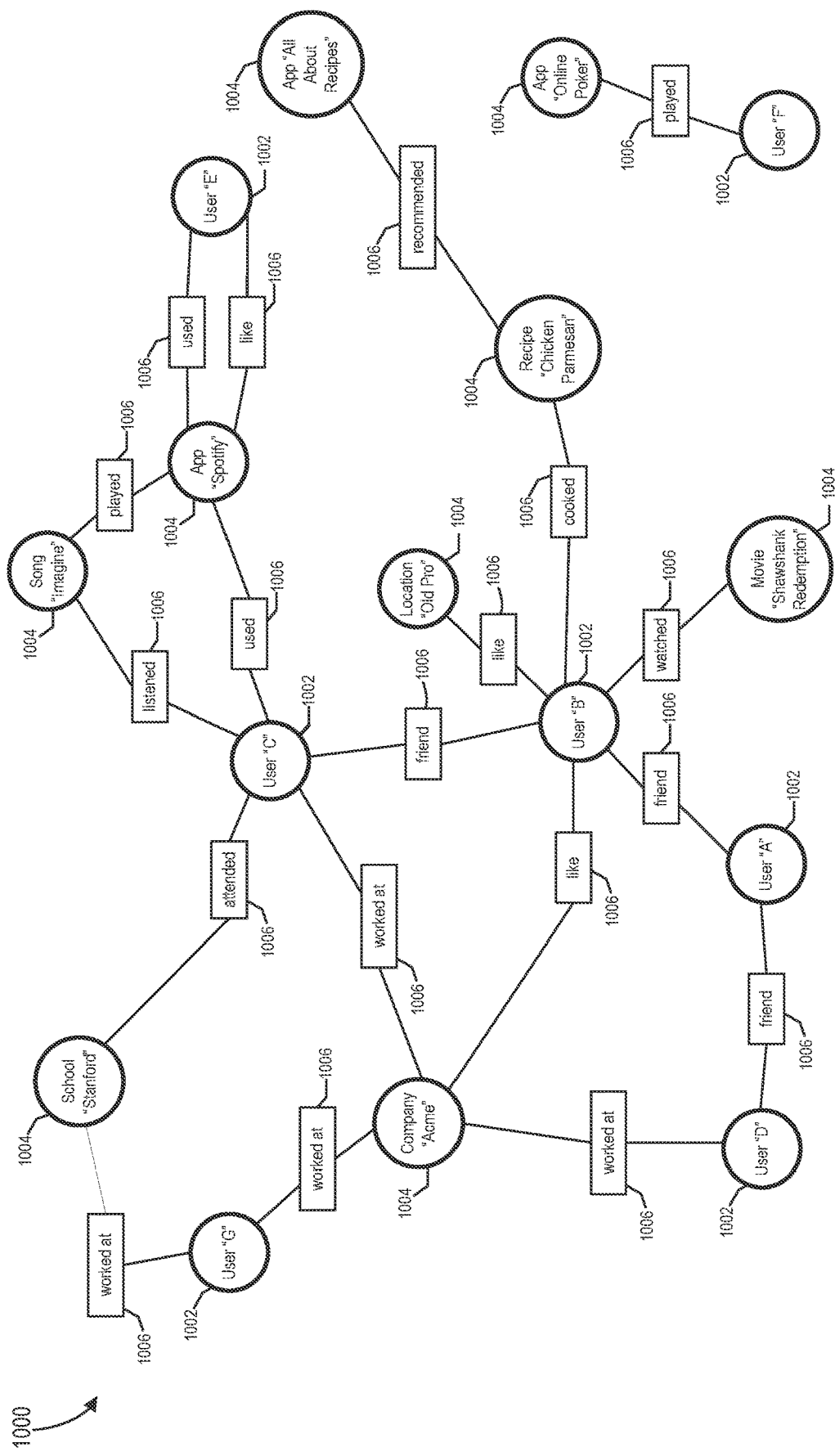
FIG. 10 illustrates an example social graph for a social networking system in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social networking system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept nodes 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party system 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept nodes 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept nodes 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client device 906) may indicate that he or she likes the concept represented by the concept nodes 1004 by clicking or selecting a "Like" icon, which may cause the user's client device 906 to send to social networking system 902 a message indicating the user's liking of the concept associated with the concept-profile page. In response to the message, social networking system 902 may create an edge 1006 between user node 1002 associated with the user and concept nodes 1004, as illustrated by "like" edge 1006 between the user and concept nodes 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner. In one or more embodiments, the social networking system 902 includes a node for each digital graphic and associated animation(s).

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client device 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

I claim:

1. A method comprising:
providing, from a first client device, a video of an object for presentation on a second client device;
receiving, from the second client device, an indication of a selection of a digital graphic from among a set of digital graphics;
detecting a motion of the object within the video;
based on the selected digital graphic and the motion of the object, determining an animation effect for the digital graphic; and
providing, for display on the first client device and the second client device, the video comprising the digital graphic as an overlay on the video of the object with the animation effect.

2. The method of claim 1, wherein providing the video comprises providing a live-stream video originating from the first client device.

3. The method of claim 1, further comprising:
detecting an additional motion of an additional object within an additional video; and
providing, for display on the first client device and the second client device, the additional video comprising the digital graphic as an overlay on the additional video of the additional object with the animation effect.

4. The method of claim 1, further comprising:
receiving an indication that a magnitude of the motion has changed; and
based on the indication that the magnitude of the motion has changed, adjusting the animation effect of the digital graphic.

5. The method of claim 1, wherein determining the animation effect for the digital graphic comprises determining that the motion of the object corresponds to a scaling animation that scales the digital graphic based on the motion of the object within the video.

6. The method of claim 1, wherein determining the animation effect for the digital graphic comprises determining that the motion of the object corresponds to a mimicking animation that mimics the motion of the object within the video.

7. The method of claim 1, further comprising:
detecting a brightness of the object or background within the video or a change in light detected by the first client device; and
changing a color of the digital graphic based on the brightness of the object or the background or the change in light detected by the first client device.

8. The method of claim 1, further comprising:
accessing metadata associated with the digital graphic;
determining the metadata specifies that motions of an object type trigger the animation effect; and
triggering the animation effect based on the object within the video being of the object type.

9. The method of claim 1, wherein:
determining the animation effect for the digital graphic comprises identifying a particular animation effect that changes a portion of the digital graphic; and
providing the video comprising the digital graphic as an overlay comprises providing the digital graphic as an overlay on the video with the animation effect that changes the portion of the digital graphic.

10. A non-transitory computer readable medium storing instructions thereon that, when executed by at least one processor, cause a computing device to:
provide, from a first client device, a video of an object for presentation on a second client device;

receive, from the second client device, an indication of a selection of a digital graphic from among a set of digital graphics;
    detect a motion of the object within the video;
    based on the selected digital graphic and the motion of the object, determine an animation effect for the digital graphic; and
    provide, for display on the first client device and the second client device, the video comprising the digital graphic as an overlay on the video of the object with the animation effect.

11. The non-transitory computer readable medium of claim 10, further comprising instructions that, when executed by the at least one processor, cause the computing device to provide the video by providing a live-stream video originating from the first client device.

12. The non-transitory computer readable medium of claim 10, further comprising instructions that, when executed by the at least one processor, cause the computing device to:
    detect an additional motion of an additional object within an additional video; and
    provide, for display on the first client device and the second client device, the additional video comprising the digital graphic as an overlay on the additional video of the additional object with the animation effect.

13. The non-transitory computer readable medium of claim 10, further comprising instructions that, when executed by the at least one processor, cause the computing device to determine the animation effect for the digital graphic by determining that the motion of the object corresponds to a scaling animation that scales the digital graphic based on the motion of the object within the video.

14. The non-transitory computer readable medium of claim 10, further comprising instructions that, when executed by the at least one processor, cause the computing device to determine the animation effect for the digital graphic by determining that the motion of the object corresponds to a mimicking animation that mimics the motion of the object within the video.

15. The non-transitory computer readable medium of claim 10, further comprising instructions that, when executed by the at least one processor, cause the computing device to:
    detect a brightness of the object or background within the video or a change in light detected by the first client device; and
    change a color of the digital graphic based on the brightness of the object or the background or the change in light detected by the first client device.

16. A system comprising:
    at least one processor; and
    at least one non-transitory computer readable storage medium storing instructions that, when executed by the at least one processor, cause the system to:
        provide, from a first client device, a video of an object for presentation on a second client device;
        receive, from the second client device, an indication of a selection of a digital graphic from among a set of digital graphics;
        detect a motion of the object within the video;
        based on the selected digital graphic and the motion of the object, determine an animation effect for the digital graphic; and
        provide, for display on the first client device and the second client device, the video comprising the digital graphic as an overlay on the video of the object with the animation effect.

17. The system of claim 16, further comprising instructions that, when executed by the at least one processor, cause the system to provide the video by providing a live-stream video of a person originating from the first client device.

18. The system of claim 16, further comprising instructions that, when executed by the at least one processor, cause the system to:
    detect an additional motion of an additional object within an additional video; and
    provide, for display on the first client device and the second client device, the additional video comprising the digital graphic as an overlay on the additional video of the additional object with the animation effect.

19. The system of claim 16, further comprising instructions that, when executed by the at least one processor, cause the system to:
    access metadata associated with the digital graphic;
    determine the metadata specifies that motions of an object type trigger the animation effect; and
    trigger the animation effect based on the object within the video being of the object type.

20. The system of claim 16, further comprising instructions that, when executed by the at least one processor, cause the system to:
    determine the animation effect for the digital graphic comprises identifying a particular animation effect that changes a portion of the digital graphic; and
    provide the video comprising the digital graphic as an overlay by providing the digital graphic as an overlay on the video with the animation effect that changes the portion of the digital graphic.

* * * * *